United States Patent [19]

Abe et al.

[11] Patent Number: 5,353,404
[45] Date of Patent: Oct. 4, 1994

[54] INFORMATION PROCESSING SYSTEM

[75] Inventors: Hitoshi Abe; Toshimitsu Ando; Shigeko Yazawa; Yoshio Kiriu; Yasuhiko Hatakeyama, all of Hadano, Japan

[73] Assignee: Hitachi, Ltd., Tokyo, Japan

[21] Appl. No.: 468,271

[22] Filed: Jan. 22, 1990

[30] Foreign Application Priority Data

Jan. 23, 1989 [JP] Japan ................................ 1-12011

[51] Int. Cl.$^5$ ............................................ G06F 15/62
[52] U.S. Cl. .................................. 395/164; 395/165; 395/152; 395/166
[58] Field of Search .............................. 364/518–522; 395/152–154, 164–166

[56] References Cited

U.S. PATENT DOCUMENTS 4,648,045  3/1987  Demetrescu .................. 364/518
4,873,585 10/1989  Blantone t al. ............... 364/521 X
5,170,468 12/1992  Shah et al. ..................... 395/166

OTHER PUBLICATIONS

Nikkei CG, "VTR", p. 16, Jun. 1988.

*Primary Examiner*—Heather R. Herndon
*Assistant Examiner*—Almis Jankus
*Attorney, Agent, or Firm*—Fay, Sharpe, Beall, Fagan, Minnich & McKee

[57] ABSTRACT

Frames of digital data each representing a single picture of a video motion picture display are handled in a computer system with an extended memory operating in parallel with a computer system instruction processor and main memory to bypass the computer system input/output processor for continuously outputting the video information on a real time basis. The outputted data may be recorded continuously at a constant data rate for an entire motion picture worth of information or actually displayed on the video display on a real time basis. The extended storage has a memory larger than the main memory, where all of the frame data is stored and read out in high speed bursts to a buffer that continuously reads the data out of the buffer for outputting. At least a start command and a starting address in the extended memory are contained within the main memory to be read out and decoded by the instruction processor and computer system memory storage control, for transfer to the extended memory, where they are used to start the program, which includes extended memory control words stored in the main memory, which control words are decoded and executed in the extended memory in parallel with the computer system instruction processor. Addresses of succeeding frames are generated and decoded and used for fetching entirely within the extended memory, for memory areas according to indirect addressing. The extended memory has external data transfer and internal data transfer registers that hold command words for respective transferring programs that may be operated in parallel, with conflict between external transfer and internal transfer being decided in favor of external transfer to assure continuous data outputting.

83 Claims, 15 Drawing Sheets

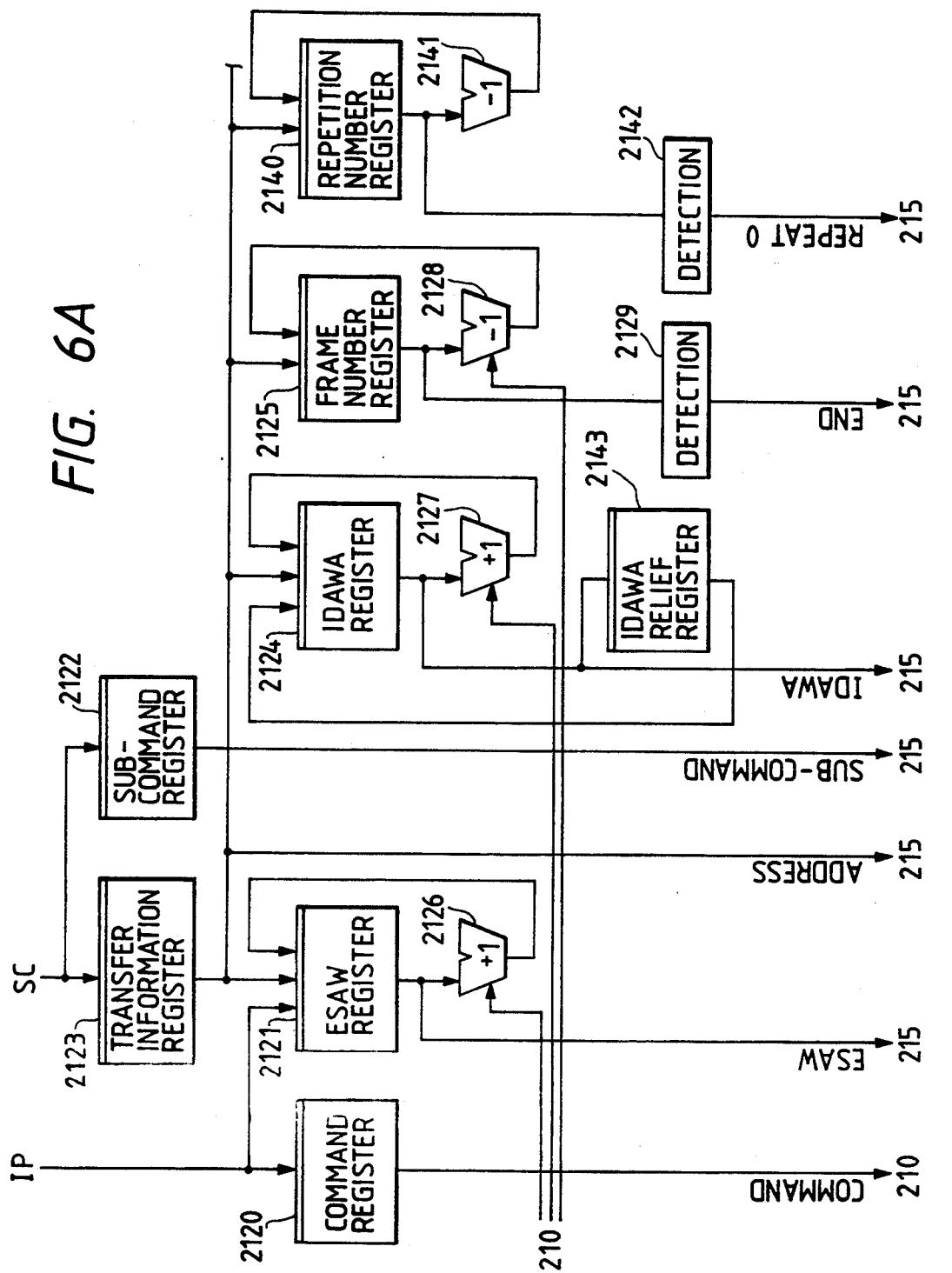

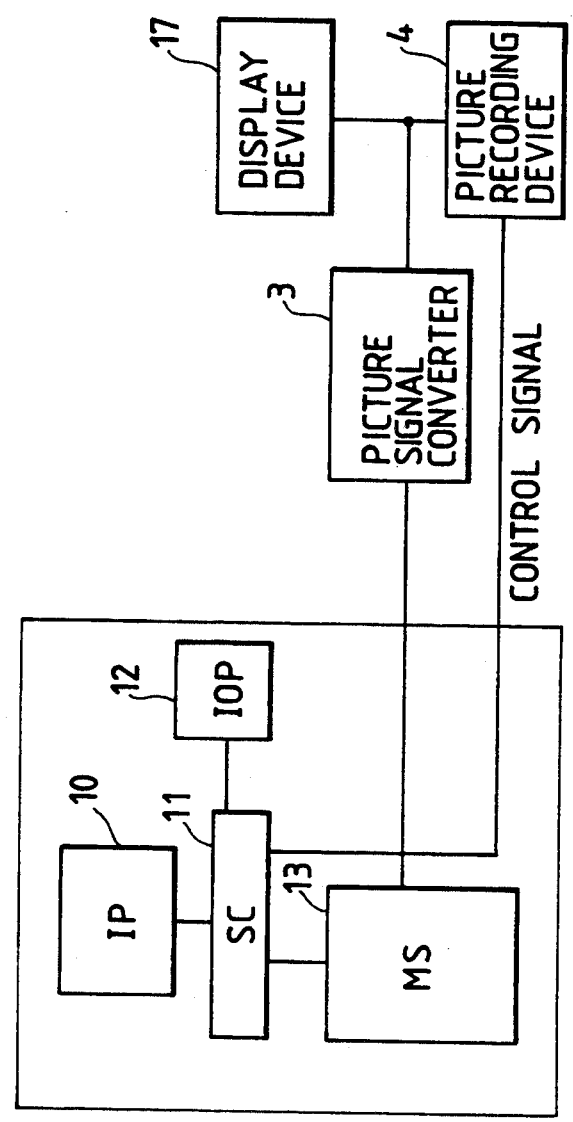

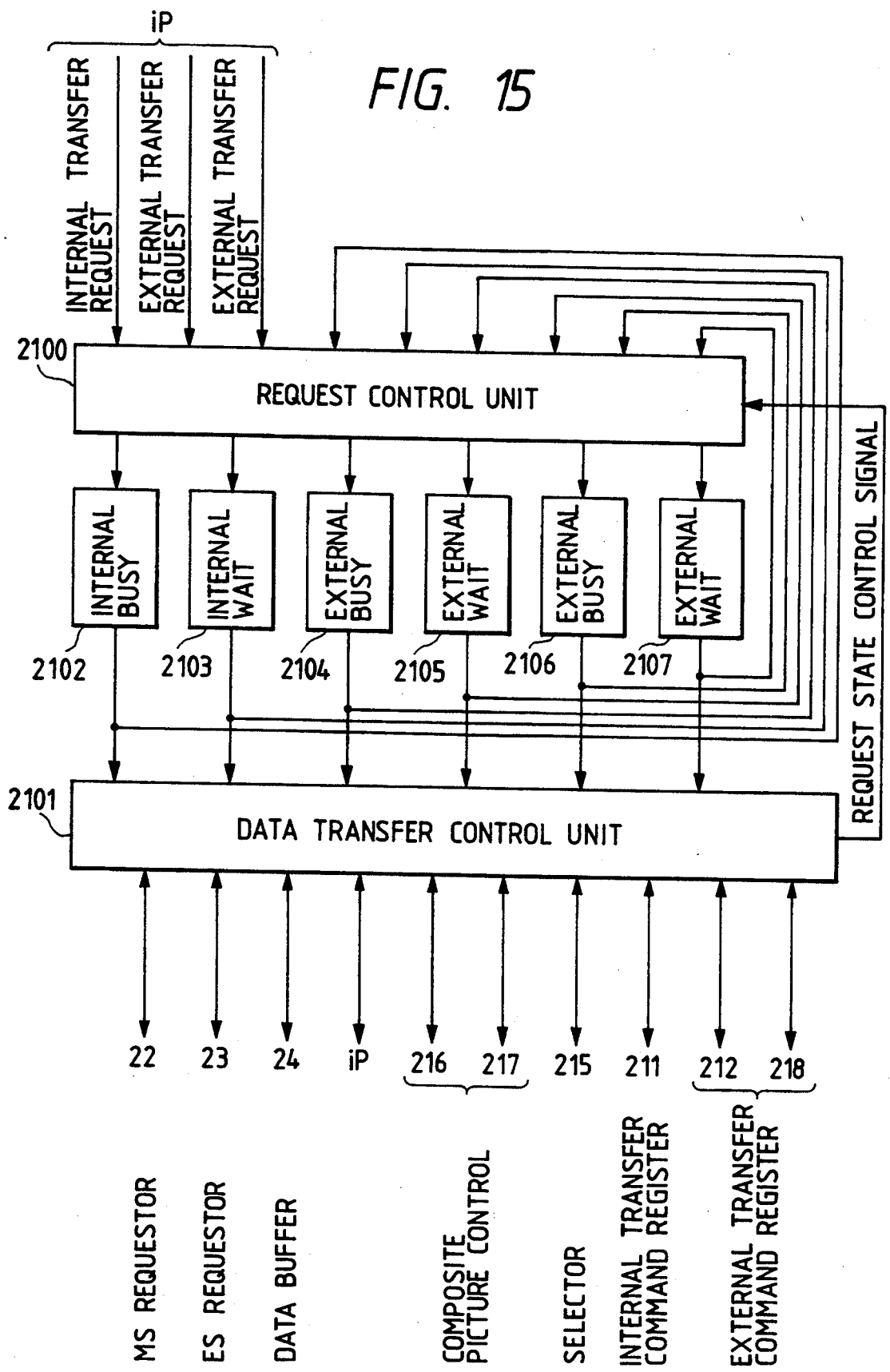

INFORMATION PROCESSING SYSTEM

BACKGROUND

The present invention relates to an information processing system having motion picture displaying and recording functions.

Applications of computer graphics have become important in various fields in recent years. One application converts and displays a great amount of numerical data computed by information processing devices such as digital computers. The numerical data for physical or engineering analysis is converted into a still picture to be grasped at a glance, so that they may be efficiently recognized. In two- or three dimensional analyses of fluids, for example, the display of motion pictures (i.e., animations) is more effective than the still pictures for grasping the motions of the flow momently so that the grasp of the meaning of phenomena and the clarification of causes can be efficiently accomplished.

The known technique relating to the motion picture displaying and recording system by the digital computer is using the single-frame picture function of the video tape recorder "VTR" in "Nikkei CG (on pp 16, June of 1988)", for example. The structure, as disclosed, is shown here in FIG. 2.

According to this technology, the usual input/output device 12 of the digital computer, provides data to an external frame data memory 14 "frame memory", which stores only the RGB picture data generated in the digital computer for one frame "frame" of a display device 17. The picture data of one frame are read out from memory 14, when stored, at an output rate according to the conversion system of picture signal converter 15 and sent out to the picture signal converter 15 so that they are converted into analog video signals (e.g., NTSC (National Television System Committee) signals) and fed to a recording device (VTR) 1¢5. Since the frame memory 14 repeatedly reads out the same frame data until it is rewritten by new frame data (i.e., the picture data of the next frame) inputted from 10P 12, the same frame is held on the display device 17 as a still picture.

In order that the frame data formed by the digital computer in the aforementioned system may be observed as motion pictures, it is instructed from the side of the digital computer to repeatedly feed the frame data of only one frame to the recording device 16, as described above, so that only one frame may be recorded (by a single-frame shot) through the control interface of the recording device 16 for one out of many repetitions. By repeating these operations for subsequent frames, the frame data to be viewed later as motion pictures are sequentially stored in the recording device 16 as plural still pictures, with the recorder being stopped between different frames. At last, the single-frame picture data stored in the recording device 16 are played back or reproduced at an ordinary continuous speed and displayed in the display device 17 so that they are displayed as motion pictures to the human eyes (called the "single-frame motion picture system").

SUMMARY

The aforementioned prior art, relating to the single-frame motion picture system, cannot display and record the motion picture data on real time, but takes a long time for processing the motion pictures so that it has poor time efficiency in visually recognizing the computed results of the digital computer.

If an attempt is made to solve the prior art problem to display and record the motion pictures on real time, there arise other problems in requiring a large capacity main storage 13 "MS" for storing a great amount of motion picture data and in the high speed data transfer of an input/output processor 12 "IOP". These problems will be appreciated by a simplified numerical example. It is assumed that one frame is composed of 500×650 picture elements, and that one picture element requires data of 1 byte for 256 gradations of intensity of display. Then, the data for one frame requires about 1 $M(2^{20})$ bytes. If thirty frames (according to the NTSC standards) per 1 sec are necessary for natural motion pictures, a storage capacity of about 34 Mbytes is necessary for motion picture display of 1 sec, and a storage capacity of about 1.8 G ($2^{30}$) bytes is necessary for motion picture display of about 1 minute. The data transfer rate required from the IOP 12 to the picture signal converter is required to be 34 Mbytes/sec or more.

Here, what is meant by the "motion picture display of real time" is not the display by using the single-frame pictures of the recording device, but the picture display in which the frames are smoothly switched 15 to 30 times for 1 sec by the outputs from the memory directly and sequentially.

As has been described continuous output throughput of 34 Mbytes/sec is required for a TV display conforming to the NTSC standards, and a memory having a capacity of about 1.8 Gbytes is required for the display of 1 minute. Even with the super large-sized digital computer of the present invention, that is super computer, however, the above specified massive MS capacity and high IOP transfer rate are not always covered with ease. Thus, the motion pictures are produced prior to the present invention by the single-frame method.

An object of the present invention is to provide an information processing system which can display and record the motion picture data prepared and stored in a digital computer, on real time.

In order to solve the above-specified object, there is provided an information processing comprising: an instruction processing unit, an input/output processing unit, a memory, a memory control unit, and an extended storage for frame data written in extended storage memory at a rate matching the frame display/recording a n d outputting them sequentially to the outside at such a predetermined time interval that the frame data may be viewed or recorded on real time as a motion picture.

In order to improve the memory using efficiency: the operation of reading one or more frame data written in the memory in response to the start from the instruction processing unit and outputting the frame data sequentially to the outside at such a predetermined time interval that the frame data may be viewed on real time as a motion picture is executed in parallel with the operation of writing or reading in or from the memory or an instruction operation other than the memory access of the instruction processing unit.

For multiplex parallel outputs of the motion pictures, there is simultaneously executing of a plurality of operations of reading one or more frame data written in the memory in response to the start from the instruction processing unit and outputting the frame data sequentially to the outside at such a predetermined time interval that the frame data may be viewed on real time as a motion picture.

In order to reduce the storage restrictions upon the image data on the memory, frame data is read from the memory, when the individual picture data are either rearranged over memory areas not continuous as physical addresses or stored from a suitable address block boundary to establish a constant vacant area between the individual frame data.

In order to find wide applications to various picture signal conversion systems, there is outputting the picture data sequentially to the outside from the information processing system in synchronism with clocks according to the signal conversion rate of the picture signal conversion.

In order to provide a system capable of recording on real time and forming motion pictures longer than the memory capacity there is synchronizing of the output start time of the picture signals and the recording start time to form a precise compound picture even when the recording of a plurality of continuous frames is accomplished intermittently and repeatedly.

In order to provide a system capable of outputting various frames, there is repeated optional reading of identical frame data to display the frame in a still picture and record the same, and to display the motion picture slowly and record the same.

A hierarchical storage, an extended storage "ES", of large capacity in the digital computer is utilized to store the motion picture data prepared in the digital computer, and high-speed interface from the ES is provided so that the picture data are fed therethrough to a picture signal converter at a constant speed required for motion pictures to be viewed on real time.

The data "internal transfer" between the MS and the ES and the "external transfer" of the motion picture data through the high-speed interface at a constant speed are separated for the data structure in the ES and the control so that they can be executed in parallel.

The instruction processor "IP" is not occupied during the external transfer of the ES so that it can execute and control instructions other than the ES instruction in parallel.

There are provided a plurality of high-speed interfaces from the ES so that the picture data can be fed therethrough to plural picture signal converters at such a constant time interval to be viewed as motion pictures on real time.

There are provided storage address conversion, data structure and control to read and transfer the frame data at such a constant time interval that motion pictures can be viewed on real time, even if the frame data are rearranged on a storage not continuous in physical addresses or if the individual frame data have a constant vacant area in between so that they may be stored from a suitable address boundary.

In the present invention, the information processing system starts the recording from the designated position of the recording medium for forming the composite pictures accurately from the designated recording medium position even when a plurality of continuing frames are recorded intermittently and repeatedly. This makes it possible to form long motion pictures exceeding the storage capacity of the real time recording.

The present invention has a branching instruction in addition to the ES frame data transfer instruction so that it can accomplish the still display and recording of frames and the slow display of motion pictures.

The present invention will be described in detail in connection with embodiments thereof with reference to the accompanying drawings. The description will be made in the following order:

(1) At first, the ES instruction specifications will be described.
(2) Next, the external transfer operations of the ES of the present invention will be described. The accompanying description is that the ES data are read out so that the picture data can be sent out at a constant time interval necessary for the motion pictures.
(3) As an example of the write/read other than the external transfer of the ES, the internal transfer operations for the data transfer between the MS and the ES will be described as a basis of the parallel operations of the subsequent external transfer and internal transfer.
(4) The parallel operations of the internal transfer and one or more external transfers will be described with respect to the start controls of the individual instructions, the data structure and control of the operation switching.
(5) The present invention can also have its storage exemplified by the MS.
(6) The system for displaying and recording motion pictures on real time, which is connected with the aforementioned ES, the picture signal converter, the display device and the recording device.
(7) Also described is the aforementioned system which has a structure matching a variety of picture converting systems. This description covers not only the clock synchronization enabling the various picture converters other than the NTSC to be connected but also the picture data reading pitch variable controls.
(8) A system which has a recording device control function to take the composite motion picture, covering the operations of the control commands and the control interfaces therefor.
(9) A system capable of displaying still pictures and slow motion pictures.

The operations of the control commands for these operations will be described.

BRIEF DESCRIPTION OF THE DRAWINGS

Further objects, features and advantages of the present invention will become more clear from the following detailed description of a preferred embodiment, shown in the drawing, wherein:

FIGS. 6(A) and 6(B) are block diagrams showing the external transfer command register 214 of the transfer command control unit 21 of FIG. 4;

FIG. 13 is a block diagram showing the structure of the information processing system according to another embodiment of the present invention;

FIG. 15 is a block diagram for describing the internal operations of the transfer control unit 210 in detail.

DETAILED DESCRIPTION OF PREFERRED EMBODIMENT

Figure 1:
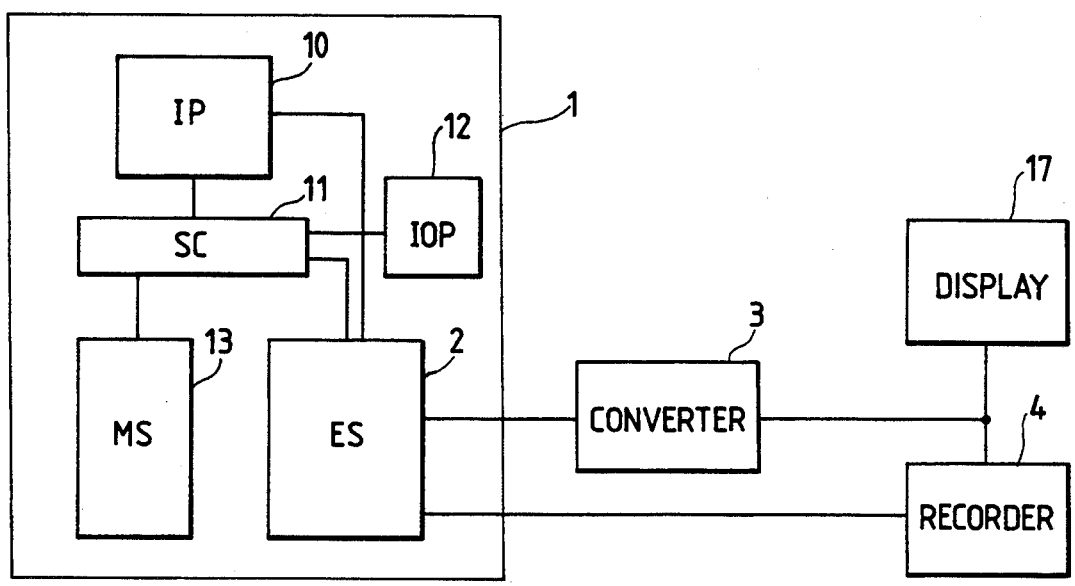
FIG. 1 is a block diagram showing the of the structure information processing system according to one embodiment of the present invention.
Figure 2:
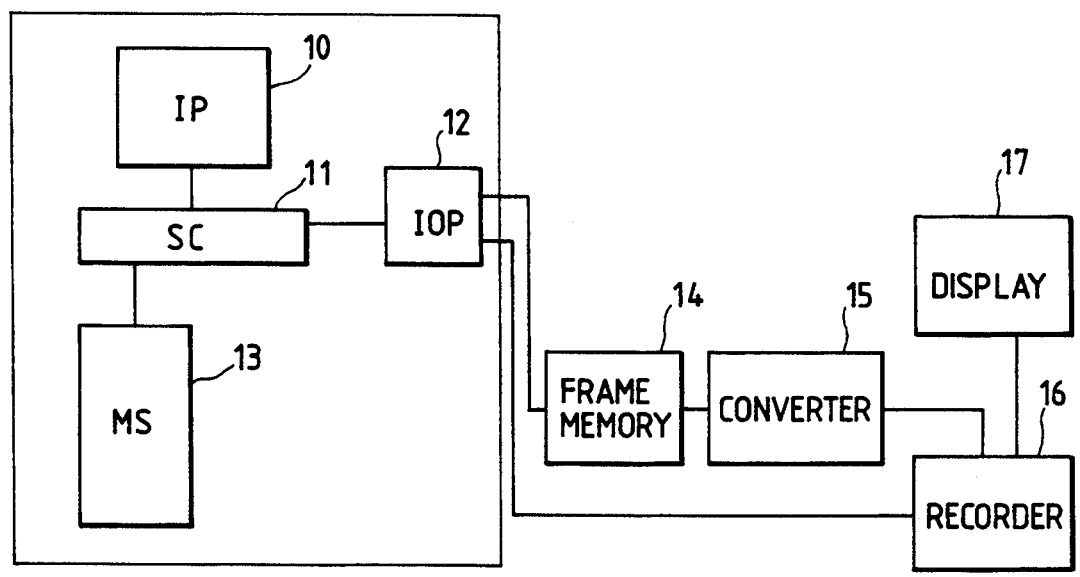
FIG. 2 is a block diagram showing the structure of the single-frame motion picture system according to the digital computer of the prior art.

FIG. 1 is a block diagram showing the characteristics of the information processing system of the present invention. The present system is constructed of: a digital computer 1, which is composed of an instruction processor (IP) 10, a storage control (SC) 11, a main storage (MS) 13, and an input/output processor (IOP) 12; an extended storage (ES) 2; a picture signal converter 3; a display device 17; and a recording device The ES 2 is a hierarchical storage execution and data handling device used to fill the gap in the access speed and the storage capacity between the MS 13 and the needs of the device external of the computer 1 and ES (e.g., a magnetic disc device acting as the recorder 4).

The ES can transfer data from the MS 213 through the SC 11, which devices MS 13 and SC 11 may be of the prior art. This is called the internal transfer, that is involving devices internal of the computer 1, or central processor.

According to the present invention, the data of the extended storage 2 can be transferred at a constant speed from the ES 2 to the external device such as the picture signal converter 3. This is called the external transfer, that is involving devices external to the computer 1. This external transfer will be described in the following in connection with the specifications of the instructions.

In order to execute the extended storage external transfer, the IP 10 and ES require two kinds of instructions: the external transfer start instruction (STRTXT instruction) for starting the ES 2, and extended storage command words "ESCW", exemplified by OUTXT, TIXT, SIGXT or SETLC for the started ES 2 to execute the external transfer.

The summary of this external transfer is as follows:

(O) instructions and commands are stored in advance in the MS 13.

(1) The STRTXT instruction is decoded by the IP 10, and the MS address "ESAW" and the external transfer device number "CN" of the ESCW are sent together with the start signal to the ES 2. Then, the STRTXT instruction is ended.

(2) If the designated external transfer device can be started, a transfer command control unit 21 of the ES 2 uses ESAW to read out the 16 byte ESCW from the MS 13 through the SC 11 and decodes the ESCW so that the. ES processes according to the result. Moreover, the transfer command control unit 21 likewise reads out the extended storage indirect data address word "IDAW" to process the data transfer in accordance with the address.

(3) At the end of the processing of the ES 2, an external interruption is generated for the IP 10.

The STRTXT in struction takes the following format:

| OP | RI | |

The OP field is an instruction code, and the MS address, ESAW, is stored in the following format in the general-purpose register designated by the R1 field. The MS address ESAW designated in R1 has the following form.

| 0 1 | | 28 31 |
| | NS/address | |

The general-purpose field designated at (RI+1) stores the external transfer device number (CN) in the following format:

R1 + 1:

| 0 7 | 31 |
| CN | |

When the IP 10 executes the STRTXT instruction, the designated MS address and CN are sent together with the start signal to the ES2, thus ending the STRTXT instruction.

Using the ESAW, the ESCW is fetched from MS by the ES 2. The ESCW is a 16 byte command word instructing the external transfer from the ES 2, and ESCW is decoded and executed at the ES. The code bits O to 3 of each command word ESCW are transfer auxiliary codes specifying the processing content of the ES, that is specifying one of the following ESCW's:

OUTXT
  (Output to External Transmission Interface);
SIGXT
  (Signal to External Transmission Interface);
SETLC
  (Set Loop-count Register); and
TIXT
  (Transfer in XT).

OUTXT

The OUTXT command designates the external transfer of the ES 2.

| 0 | 4 5 | | 16 | 29 31 |
|---|---|---|---|---|
| Code | C | | | Frame Repetition No. |
| | | MS Address | | |
| | | Frame No. | | |
| | | Frame Size | | |

C Flag: Bit 4 is a command chain flag. When this flag is 1, it is indicated that an ESCW to be executed next is at the next MS address of the present ESCW. The mnemonic is C.

MS Address: Bits 33 to 61 are the leading MS addresses of the IDAW instructing the transfer ES address. The ES address of the data to be transferred is given by IDAW. The designation occurs at the boundary of 4 bytes. The mnemonic is IDAW.

Frame Size: Bits 100 to 127 designate the double word (8 bytes) number or the unit (or frame) of the transfer operations. The mnemonic is SIZE.

Frame No.: Bits 68 to 95 designate the frame number. The mnemonic is FRM.

Frame Repetition No.: Bits 16 to 31 designate the number of mnemonic is times for outputting one frame repeatedly. The REPEAT.

The mnemonic expressions are as follows:

OUTXT (C, REPEAT, IDAWA, FRM, SIZE).

When the frame size is not a whole number multiple of the block (4K) bytes ($2^{10}$ bytes), the ES addresses in the transfer operations are assigned to the next block (4 Kbytes) boundary where the transfer of the next frame is started. As a result, the data positioned after the last data of each frame to the boundary of the next block, are not transferred but skipped over in response to a skip control produced after counting the frame bytes transferred. The frames of a repetition number are outputted, and the next frame is transferred.

SIGXT

The SIGXT command is used as a control signal for the recording device 4.

```
0    4 5                              31
|Code   | C |                          |
|                                      |
|                                      |
|                                      |
```

C Flag: Bit 4 is a command chain flag.
Mnemonic expressions are as follows:

SIGXT(C).

If the SIGXT command is executed, the condition register is set to 1.

SETLC

The SETLS command is used for setting the loop upper limit in the loop counter register for the TIXT command.

```
0    4 5        16              31
|Code   | C |                    |
|                                 |
|                   | Count    |
|                                 |
```

C Flag: Bit 4 is a command chain flag. Count: Bits 80 to 95 designate the values to be set as the upper limits of the loop of the TIXT in the loop count register in the external control device. The mnemonic is COUNT.

Mnemonic expressions are as follows:

SETLC (C, COUNT).

TIXT

The TIXT command tests the values of the condition register and the loop counter register. Depending upon the test results, the execution is transferred to the ESCW of the designated MS address or to a next ESCW.

```
0      4 6        16         28    31
|Code   |  | |B |                    |
|              MS Address       |    |
|  |                                 |
|                                    |
```

MS Address: Designates the MS address of the ESCW to be subsequently executed, if the test result fails to hold; MSA. B Flag: Designates whether or not the condition register is to be tested, B. If this flag is at 1, the condition register is not tested, but only the loop count register is tested.

Mnemonic expressions are as follows:

TIXT (B, MSA).

The TIXT command is executed, as follows: For B flag=0:

1. If the condition register is tested to reveal the result of O and if the loop count register is at 0, the subsequent ESCW execution is interrupted to the end.
2. If the test result reveals that the loop count register is positive, the count is updated by −1, and the execution is shifted to the ESCW indicated at the MS address.
3. If the test result is 1, the value of the condition register is reset to 0, and the execution is shifted to the subsequent ESCW.

For B flag=1:
1. If the loop count register is at 0, the execution is shifted to the subsequent ESCW.
2. If the loop count register is positive, the count is updated by −1, and the execution is shifted to the ESCW indicated at the MS address.

ES IDAW (Indirect Data Addressing Word)

The ES addressing of the data to be transferred is accomplished in accordance with the IDAW. When the address exceeds the boundary of 1 Mbytes, the following address of the IDAW is referred to:

```
0        4                         30   31
|L |     |  ES Address              |
|L |     |  ES Address              |
   ,                                    ,
|L |     |  MS Address         |    |
```

L Flag: The bit 0 is the IDAW chain flag. If this flag is at 1, the bits 1 to 29 indicate the leading MS address of the next IDAW. If the flag is at 0, the bits 4 to 31 designate the ES address to be transferred.

ES Address: Designates the ES address of the data to be transferred with a block (4 Kbytes). MS Address: The leading address of the next IDAW and designated at the boundary of 4 bytes.

RDES

Next, the command specifications of the internal transfer will be described in connection with one example of an RDES (i.e., the instruction for transferring the data from the ES to the MS). The RDES instruction takes the following format:

```
|OP        |    | R1  | R2  |
```

The RI field designates the general-purpose register number in the IP 10. The general purpose register designated at R1 is stored with the following MS address:

R1
```
0                         28    31
|       |     MS Address   |    |
```

The R2 field designates the number of the even/odd pair of the general-purpose registers. The even/odd general-purpose register designated is stored with the ES address and the transfer block number in the following format:

R2
```
0   4                              31
| |      ES Address                |
```

R2 + 1
```
0   4                              31
| |      Transfer Block Number     |
```

When the RDES instruction is executed, the data of the ES area to be started from the ES address in the general-purpose register of R2 are transferred by the block number designated by the general-purpose register of (R2+1) to the MS area to be started from the MS address in the general-purpose register of R1.

Next, the external transfer operations of the ES 2 will be described in the following.

Figure 3:
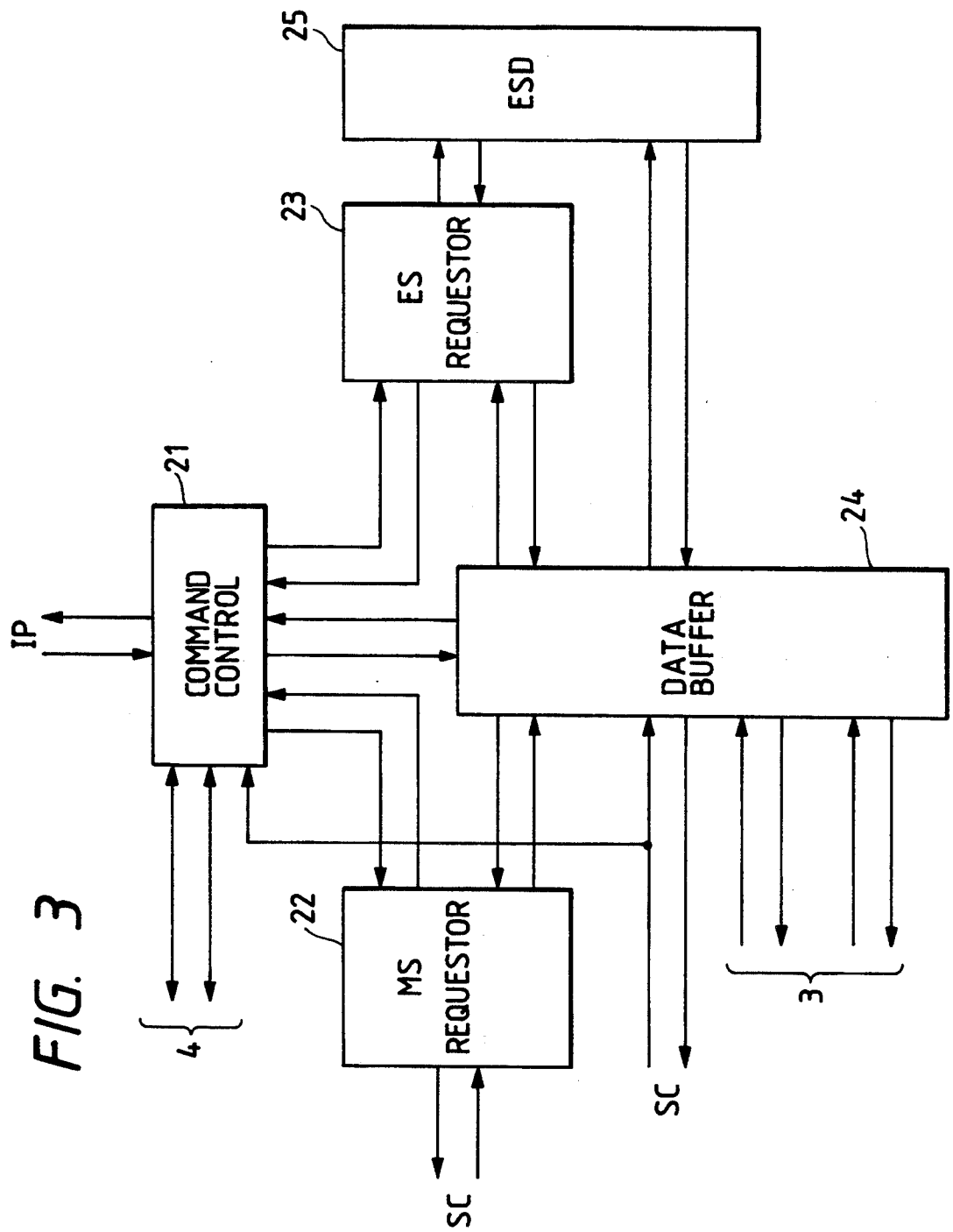
FIG. 3 is a block diagram showing the structure of the extended storage 2 of FIG. 1.

This ES 2 is composed, as shown in FIG. 3, of: a storage unit or memory "ESD" 25 for storing the data coming from the SC 11; a command control unit 21 for controlling the transfer command from the IP 10; requesters 22 and 23 for issuing write and read demands to the SC 11 and the ESD 25; and a data buffer 24 for temporarily buffering the data coming from the SC 11 and the ESD 25.

Figure 4:
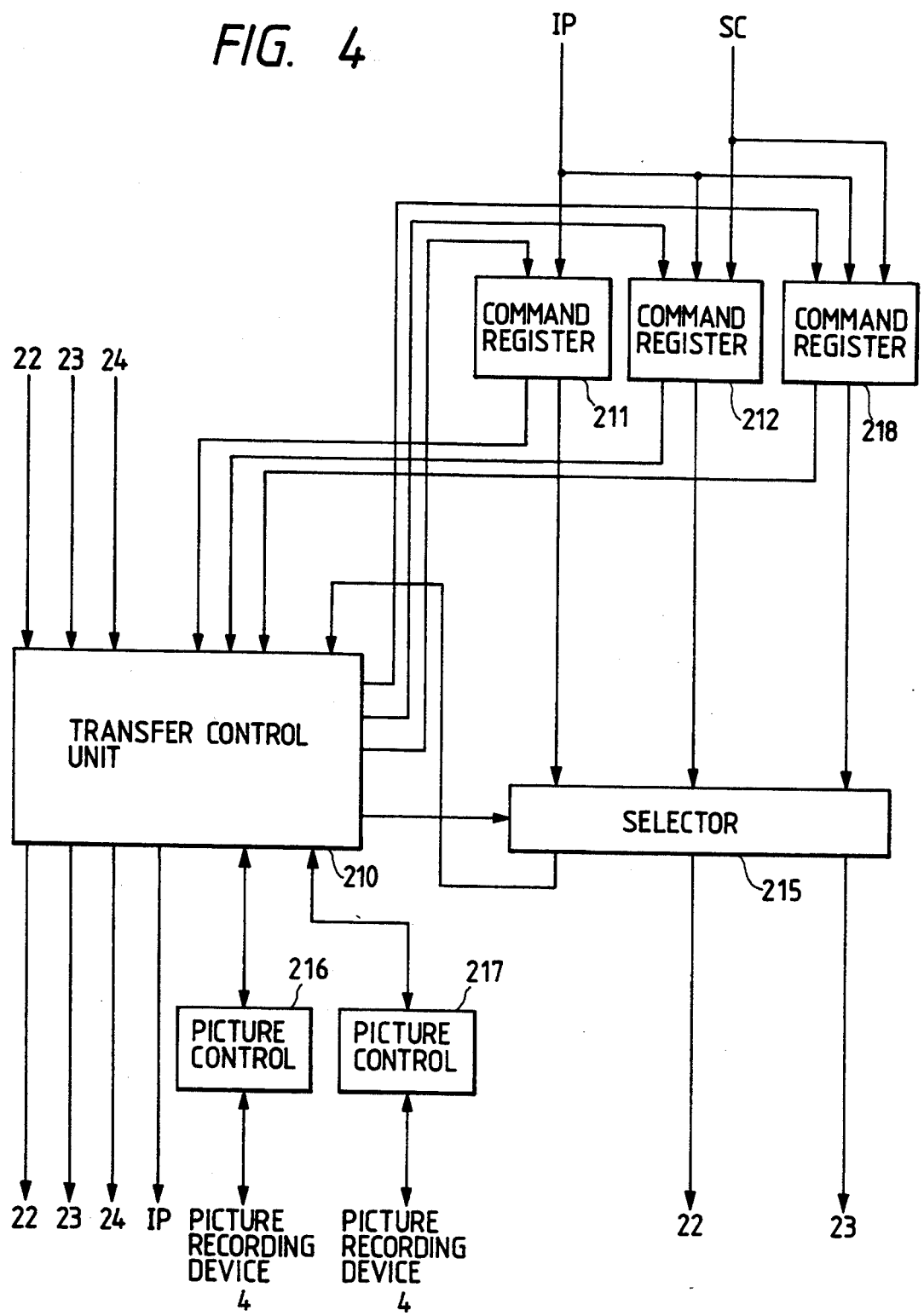
FIG. 4 is a block diagram showing the structure of the transfer command control unit 21 of the extended storage 2 of FIG. 3.

The transfer command control unit 21 is composed, as shown in FIG. 4, of: an internal transfer command register 211 for latching and controlling the transfer command from the IP 10; external transfer command registers 212 and 218 for latching and controlling both the transfer command coming from the IP 10 and the transfer auxiliary command which is read out from the MS 13 through the SC 11 on the basis of the transfer command; a selector 215 for selecting the outputs of the transfer command registers 211, 212 and 218; composite picture controls 216 and 217 for controlling the composite picture operations at the recording device 4; and a transfer control unit 210 for controlling the transfer as a whole.

Here, the internal transfer command by the RDES instruction and so on is latched and controlled by the internal command instruction register 211, and the external transfer command by the STRTXT instruction is latched and controlled by the external transfer command register 212 or 218.

Since, the external transfer command resistors 212 and 218 and the composite picture controls 216 and 217 are provided in two sets, the two STRTXT instructions can be simultaneously executed.

Figure 5:
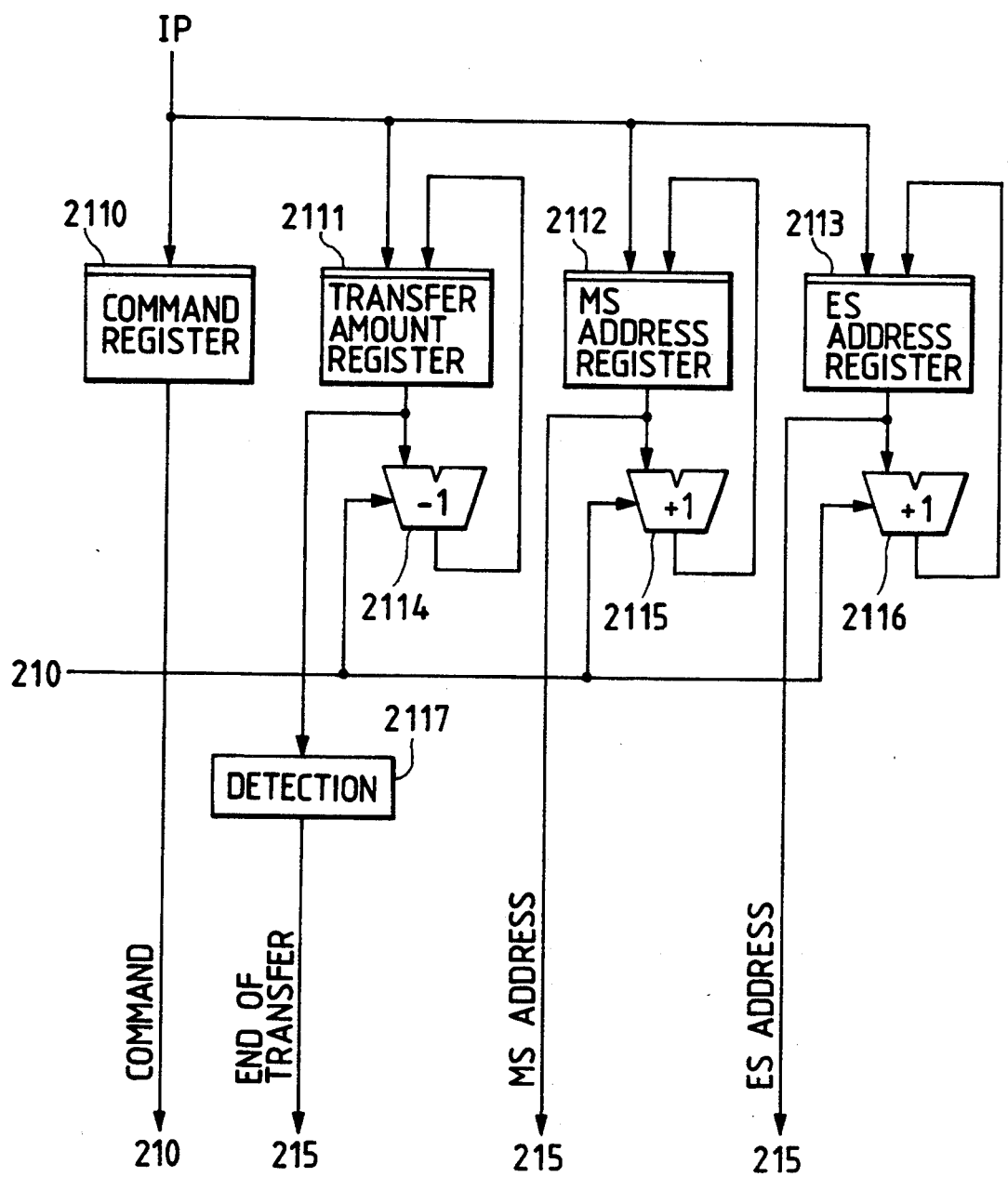
FIG. 5 is a block diagram showing the structure of the internal transfer command register 211 of the transfer command control unit 21 of FIG. 4.

The internal transfer command register 211 is composed, as shown in FIG. 5, of a command register 2110, a transfer amount register 2111, an MS address register 2112, an ES address register 2113, a subtracter 2114, adders 2115 and 2116, and a residual transfer amount test unit 2117 for detecting that the residual transfer amount in the transfer amount register 2111 is at "0".

Figure 6B:
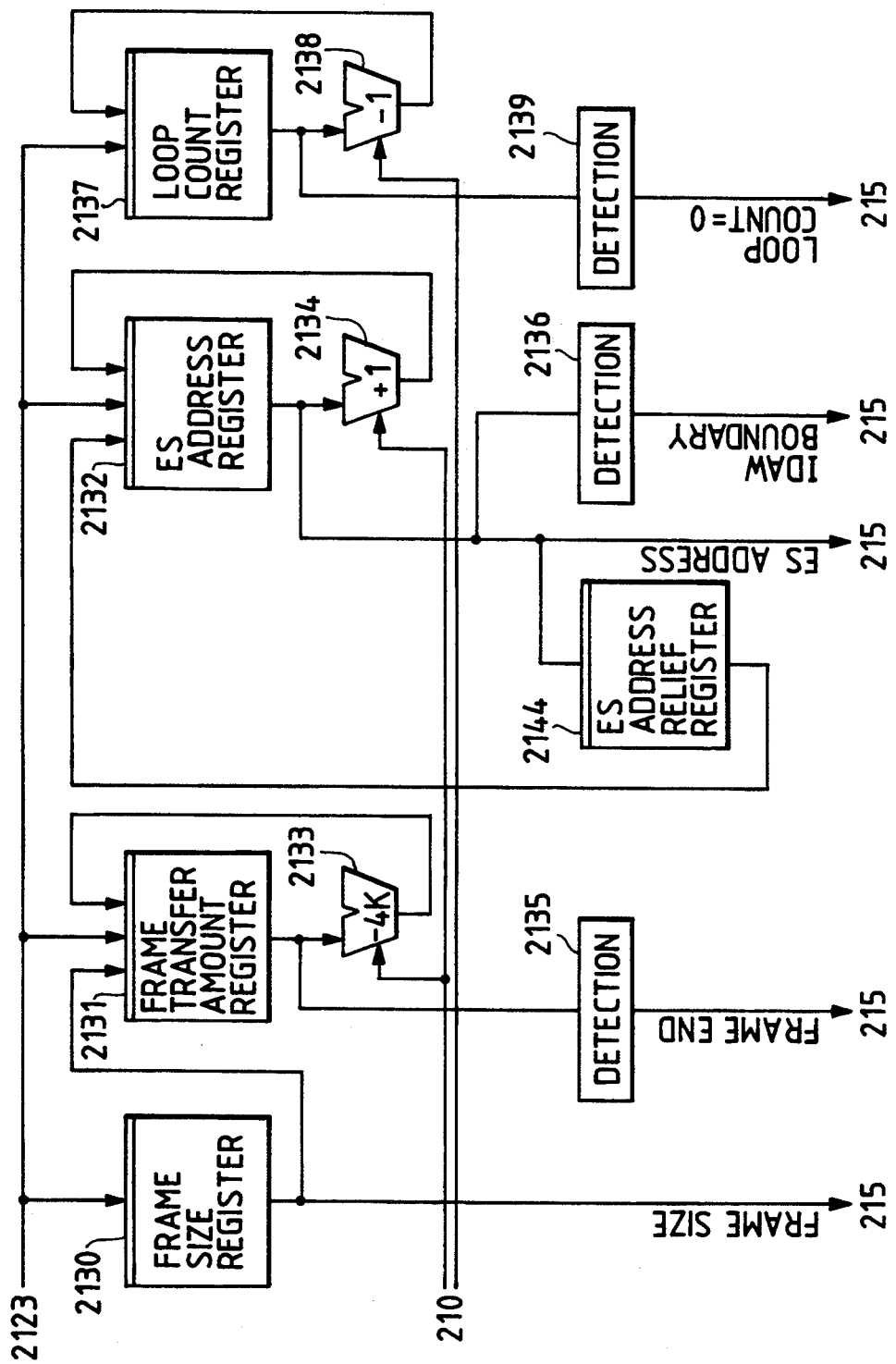

The external transfer command register 212 is composed, as shown in FIGS. 6(A) and (B), of a command register 2120, an ESAW register 2121, a subcommand register 2122, a transfer information register 2123, an IDAWA register 2124, an IDAW relief register 2143, a frame number register 2125, a frame size register 2130, a frame transfer amount register 2131, an ES address register 2132 an ES address relief register 2144, a loop counter register 2137, a repetition number register 2140, adders 2126, 2127 and 2134, subtracters 2128, 2133, 2138 and 2141, a residual frame number test unit 2129 for detecting the number of residual frames in the frame number register 2125 is at "0", a frame end test unit 2135 for detecting that the residual transfer amount in each frame in the frame transfer amount register 2131 is at "0", an IDAW boundary test unit 2136 for detecting that the ES address in the ES address register 2132 exceeds the physically discontinuous IDAW boundary, a repetition number test unit 2142 for detecting that the repetition number in the repetition number register 2140 is at 0, and a loop count test unit 2139 for detecting that the loop count number in the loop count register 2137 is at 0. The external transfer command register 218 is constructed in the same way.

The external transfer command by the STRTXT instruction is sent from the IP 10 to the ES 2 on the basis of the instruction code and the content of the general-purpose register designated by the instruction. The command thus sent contains a command such as the CN or the start signal and the ESAW. The command sent from the IP 10 is set in the corresponding registers 2120 and 2121 in the external transfer command register 212 or 218. Here, it is determined by the CN which of the external transfer command register 212 or 218 the command is to be set in. In the present embodiment, the CN is set at either "0" or "1". If the CN is at "0", the external transfer command register 212 is set. If the CN is at "1", the external transfer transfer command register 218 is set.

The commands thus set in the internal transfer command register 211 and the external transfer command registers 212 and 218 are inputted to the transfer control unit 210. This transfer control unit 210 selects one of the commands in accordance with a predetermined-rule so that the transfer operations may be executed in accordance with the content of the selected transfer command register by inputting the MS address or the like to the individual units by the selector 215.

The STRTXT instruction releases the IP 10 for subsequent duty with the computer system unrelated, parallel, to the operation of making a motion picture, as has been described hereinbefore, at the instant when the commands or addresses are set in the external transfer command registers 212 and 218. The transfer control unit 210 controls the MS requester 22, the ES requester 23 and the data buffer 24 on the basis of the contents of the external transfer command registers 212 and 218 to execute the data transfer between the ES 2 and the picture signal converter 3 independently of the IP 10. As a result, the external transfer begun with the STRTXT instruction does not occupy the IP 10 so that the IP 10 can execute an instruction other than the ES instruction in parallel with the external transfer.

The extended storage external transfer begun with the STRTXT will be described in the following, assuming that the CN is at 0, that the external transfer command is set in the external transfer command register 212, and that the command of the external transfer command register 212 is selected at the transfer control unit 210.

This transfer control unit 210 executes and controls the external transfer operations in the following manner, recognizing that the command of the external transfer command register 212, if selected, is an external transfer.

At first, the transfer control unit 210 sends the ESAW, which is set in the ESAW register 2121 in the external transfer command register 212, to the MS requester 22 through the selector 215 to command the reading of the ESCW.

Figure 7:
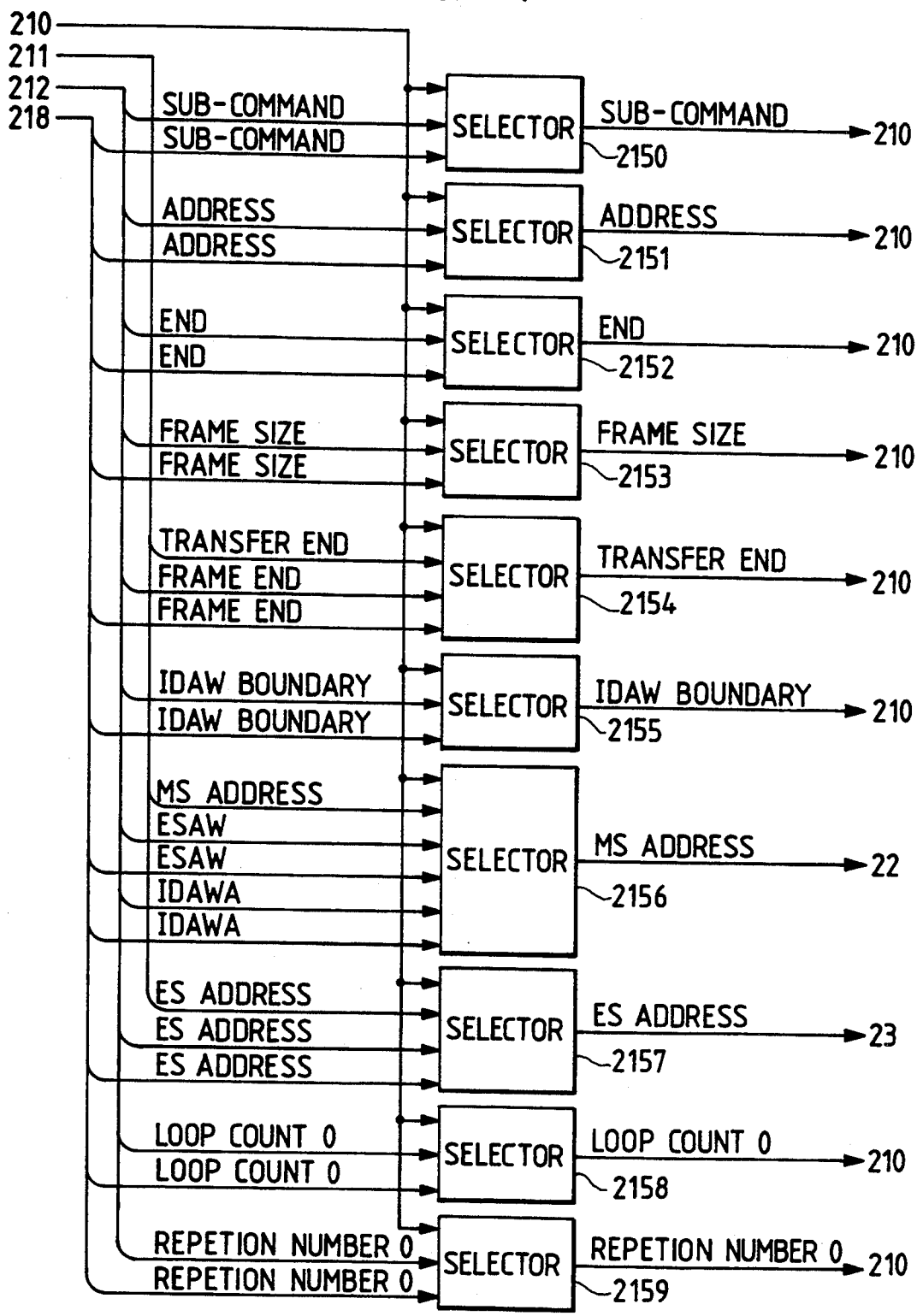
FIG. 7 is a detailed block diagram showing the selector 215 of FIG. 4.

The selector 215 is composed of selectors 2150 to 2159, as shown in FIG. 7.

In accordance with the instruction of the transfer control unit 210, the selector 215 causes the selector 2156 to select the ESAW, which comes from the external transfer command register 212, as the MS address and to input it to the MS requester 22.

Figure 8:
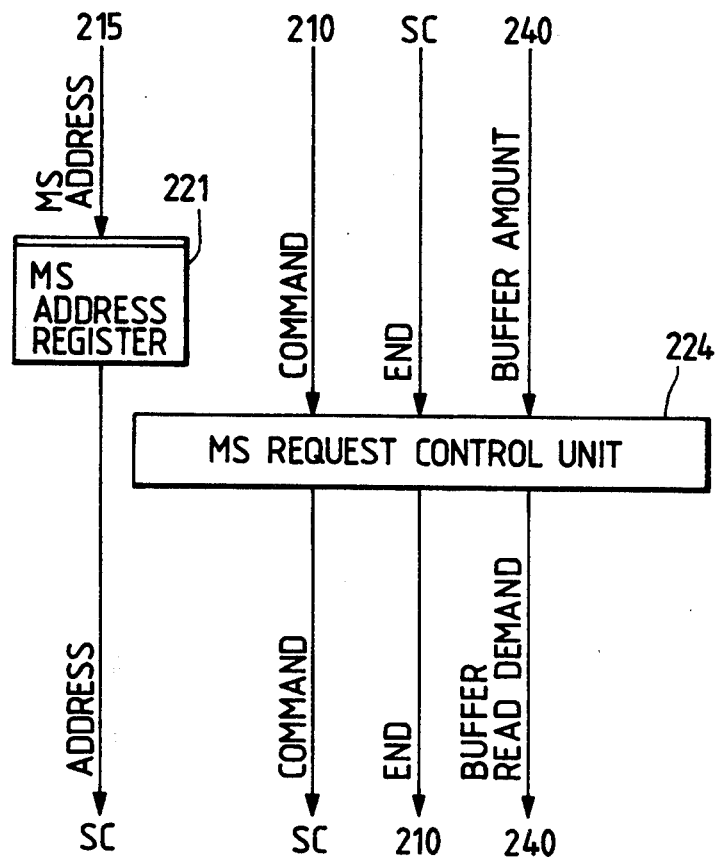
FIG. 8 is a block diagram showing the structure of the MS requester 22 of FIG. 3.

This MS requester 22 is composed of an MS address register 221 and an MS request control unit 224, as shown in FIG. 8.

The requester 22 sets, when started by the transfer control unit 210, the MS address (ESAW), which is sent from the selector 215, in the register 211 so that the command from the transfer control unit 210 is decoded in the MS request control unit 224. Since, in this case, the command is the ESCW read command, the MS requester 22 instantly sends the command together with the MS address in the MS address register 211 from the MS request control unit 224 to the SC 11 to issue a read request of 16 bytes. At this time, the transfer control unit 210 causes the adder 2126 to update the MS address in the ESAW register 2121.

The ESCW thus read out from the MS 13 by this ESCW read request is sent to the ES 2 through the SC 11. When this ESCW is sent, the ES 2 inputs it to the transfer command control unit 21 to set the ESCW read in the subcommand register 2122 and the transfer information register 2123 in the designated external transfer command register 212. Here, the subcommand register 2122 is set with the subcommand such as the codes or flags in the ESCW, and the transfer information register 2123 is set with the MS address, the frame number, the frame size, the frame repetition number and so on.

When the ESCW is set in the registers 2122 and 2123, the transfer control unit 210 receives the subcommand in the subcommand register 2122 through the selector 2150 in the selector 215 and decodes it.

In case this subcommand is decoded to reveal that the ESCW is the OUTXT command, the motion picture data stored in advance in the ES 2 are transferred to the external device such as the recording device by the external transfer operations.

If the ESCW is the OUTXT command as a result of the decoding, the transfer control unit 210 resets the content of the transfer information register 2123 of the external transfer command register 212 in the predetermined registers 2124, 2125, 2130, 2131, 2140 and 2143 of the same register 212. More specifically: the MS address in the transfer information register 2123 is set in the IDAWA register 2124 and the IDAWA relief register 2143; the frame number in the frame number register 2125; the frame size in the frame size register 2130; the frame transfer amount in the frame transfer amount register 2131; and the repetition number in the repetition number register 2140.

Next, the transfer control unit 210 sends the MS address (IDAWA), which is set in the IDAWA register 2124 of the external transfer command register 212, to the requester 22 through the selector 2156 of the selector 215 to command the reading of the IDAW.

At this time, the selector 215 causes the selector 2156 to select the IDAWA from the external transfer command register 212 as the MS address and inputs it into the MS requester 22.

The MS requester 22 sets, when started by the transfer control unit 210, the MS address (IDAWA), which is sent from the selector 215, in the MS address register 221 to decode the command from the transfer control unit 210 in the MS request control unit 224. Since, in this case, the command is the IDAW read command, the MS requester 22 instantly sends the command together with the MS address of the MS address register 221 from the MS request control unit 224 to the SC 11 to issue the read request of 4 bytes. Simultaneously with this, the IDAWA in the IDAWA register 2124 is updated.

The IDAW read out from the MS 13 in response to the IDAW read request is sent through the SC 11 to the ES 2. The ES 2 inputs the sent IDAW to the transfer command control unit 21 to set the read of the IDAW in the transfer information register 2123 of the external transfer command register 212.

When the IDAW is set in the transfer information register 2123, the transfer control unit 210 receives the address (IDAW) of the transfer information register 2123 through the selector 2151 of the selector 215 to check the L flag.

When the L flag is at "1", the content of the internal transfer command register 2123 of the external transfer command register 2 indicates the address of the MS stored in the subsequent IDAW. As a result, the transfer control unit 210 sets the content of the internal transfer information register 2123 of the same register 212 in the IDAW register 2124 of the same register 212 so that the reading of the IDAW is accomplished again by the procedures similar to the aforementioned ones.

When the L flag is at "0", the internal transfer information register 2123 of the external transfer command register 212 is set with the IDAW. As a result, the transfer control unit 210 sets the content of the internal transfer information register 2123 of the same register 212 in the ES address register 2132 of the same register 212 and the ES address relief register 2144.

Here will be described the meaning of providing the IDAW. This IDAW is used to convert the address of the ESD from the logical address into the physical address. If, in the present embodiment, the address conversion unit is at 1 Mbytes, the IDAW is equipped with a physical address at the unit of 1 Mbytes, which corresponds to the logical address of the data in the ESD 25. The transfer control unit 210 updates the ES address for the external transfer to the next IDAW of the IDAW at the unit of 1 Mbytes, namely, sets the next IDAW in the ES address register at the instant when the ES address is at the boundary of 1 Mbytes. Even in case the picture data are stored in the discontinuous physical address over the ESD 25, the picture data can be read out from the ESD 25 with the logical address being in the form of continuous address data by using the IDAW for the address conversion.

Next, the transfer control unit 210 sends the ES address of the ES address register 2132 of the external transfer command register 212 to the requester 23 through the selector 2157 of the selector 215 and the frame size of the frame size register 2130 of the same register 212 into the data buffer 24 through the selector 2153 of the selector 215 to start the ES requester 23 and the data buffer 24 thereby to command the reading of the motion picture data stored in the ES 2 and the transfer of it to the external device.

The transfer control unit 210 controls, when it receives the command of the external transfer from the ES 2, the data transfer between the ESD 25 and the data buffer 24 at the unit of 4K bytes. After the ES requester 23 and the data buffer 24 have been started, the transfer control unit 210 instructs the external transfer command register 212 to update the ES address and the residual transfer amount each time the data transfer of 4 Kbytes is executed. Upon reception of the instruction, the external transfer command register 212 causes the adder 2134 and the subtracter 2133 to increment the content of the ES address register 2132 by +1 and to decrement the content of the frame transfer amount register 2131 by −4 Kbytes.

Figure 9:
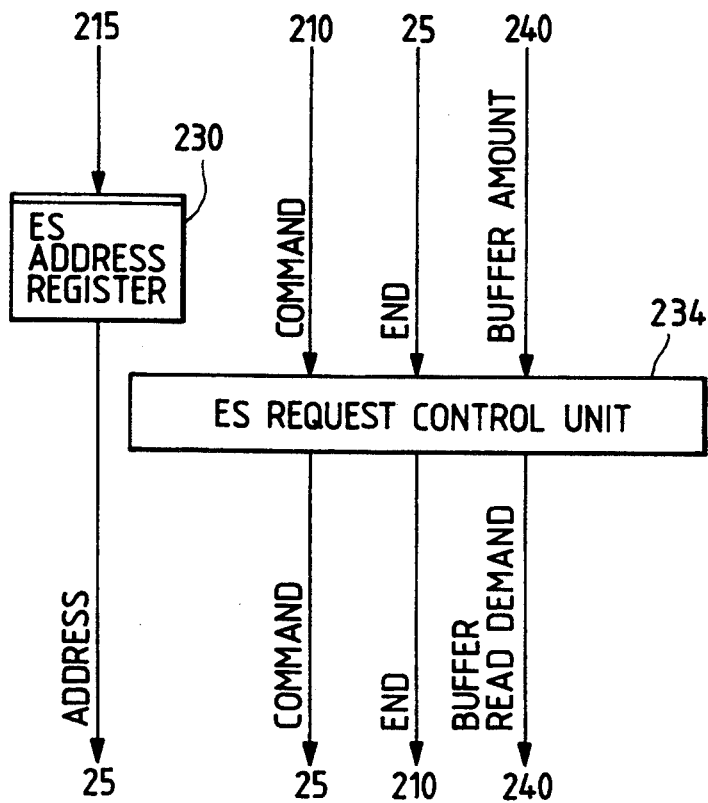
FIG. 9 is a block diagram showing the structure of the ES requester 23 of FIG. 3.

The ES requester 23 is composed of an ES address register 230 and an ES request control unit 234, as shown in FIG. 9.

When started by the transfer control unit 21(i, the ES requester 23 sets the ES address sent from the selector 21.5 in the ES address register 230 and causes the ES request control unit 234 to decode the command coming from the transfer control unit 210.

Figure 10:
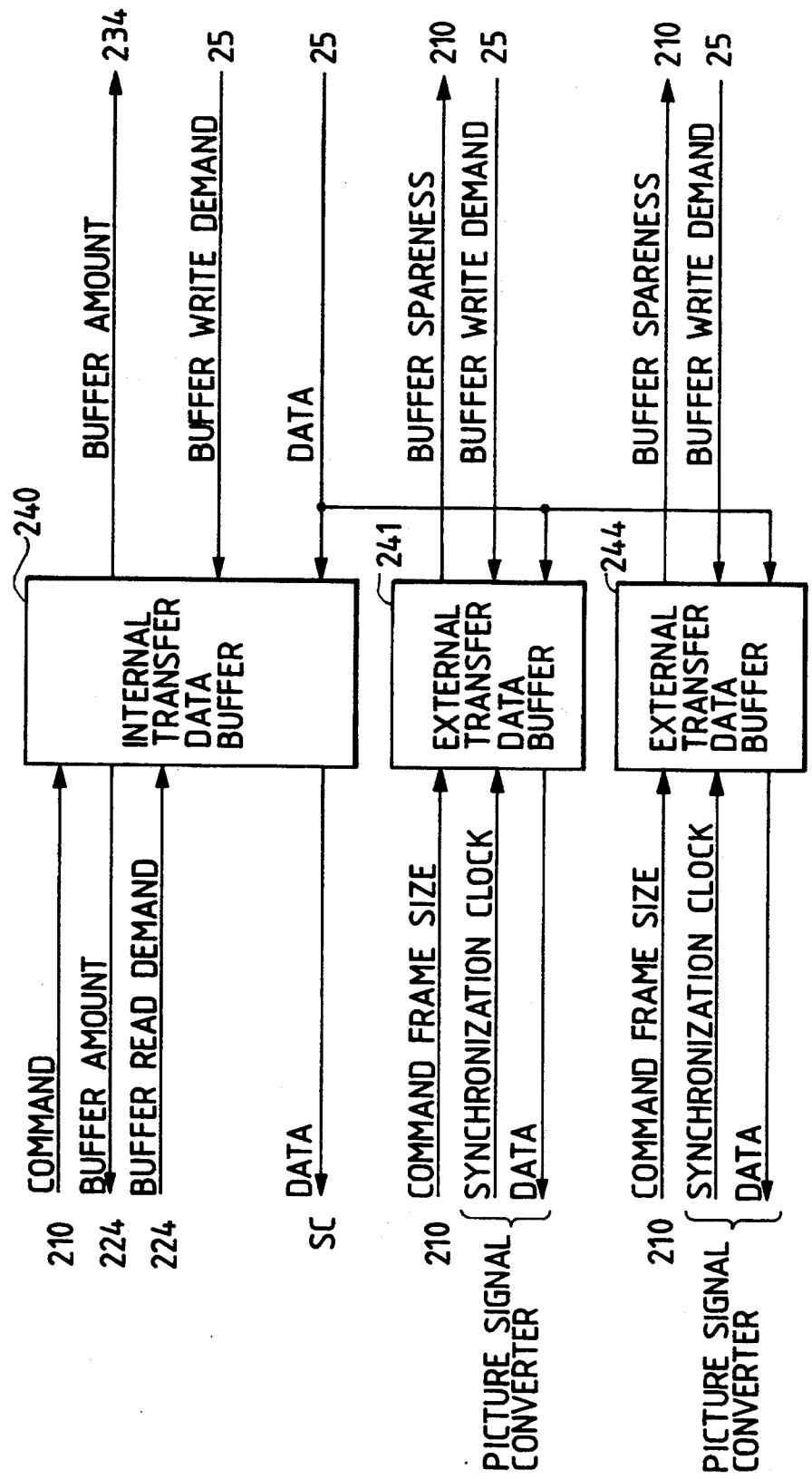
FIG. 10 is a schematic block diagram showing the extended storage data buffer 24 of FIG. 3.

The data buffer 24 is composed of an internal transfer data buffer 240 and external transfer data buffers 241 and 244, as shown in FIG. 10. Here, the individual external transfer data buffers 241 and 244 are used to respond to the CN given in accordance with the STRTXT instruction so that two STRTXT instructions may be simultaneously executed in accordance with the external transfer command registers 212 and 218.

Figure 11:
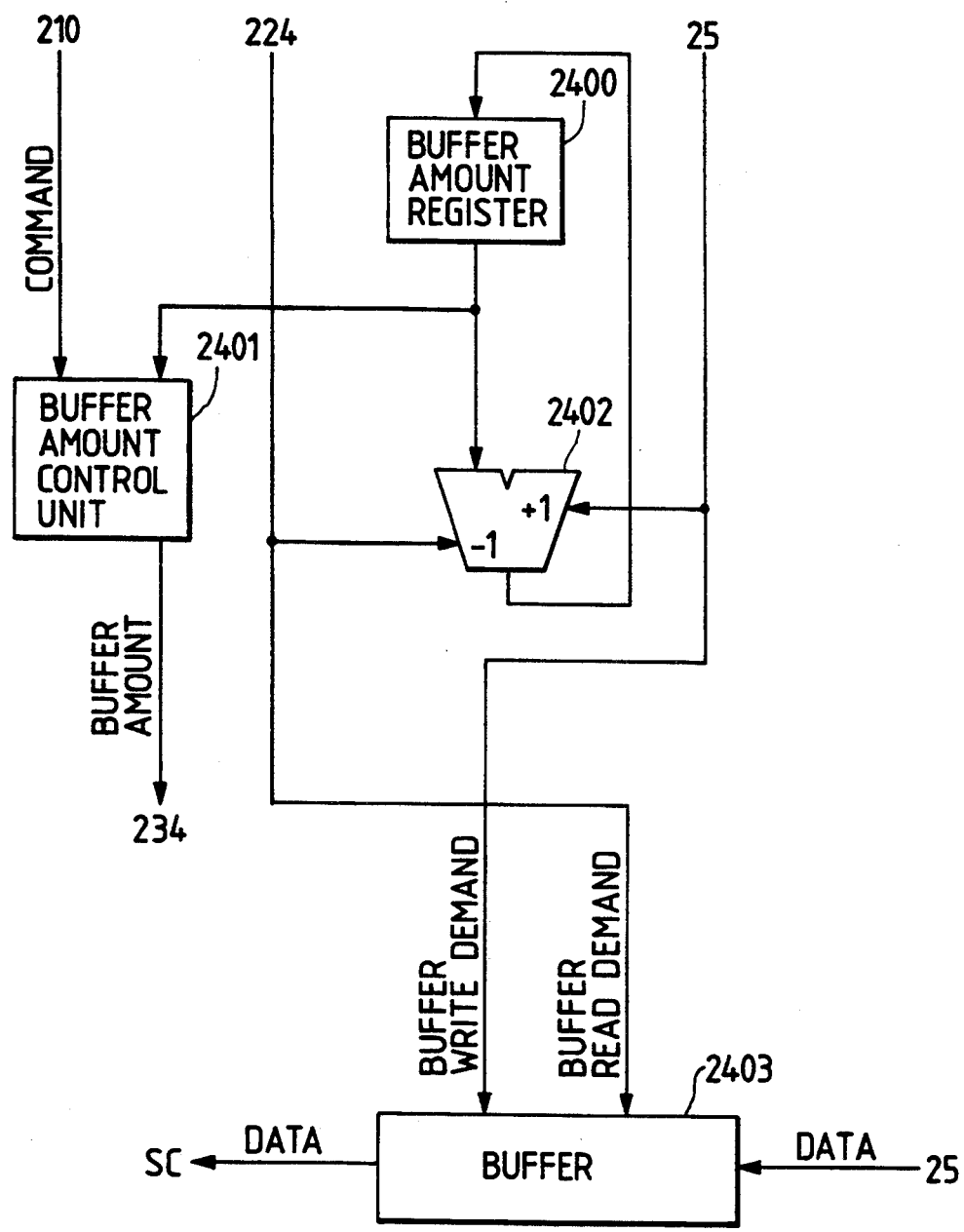
FIG. 11 is a block diagram showing the structure of the internal transfer data buffer 240 of the extended storage data buffer 24 of FIG. 10.

On the other hand, the external transfer data buffer 240 is composed of a buffer amount register 2400, a buffer amount control unit 2401, a counter 2402 and a buffer 2403, as shown in FIG. 11.

Figure 12A:
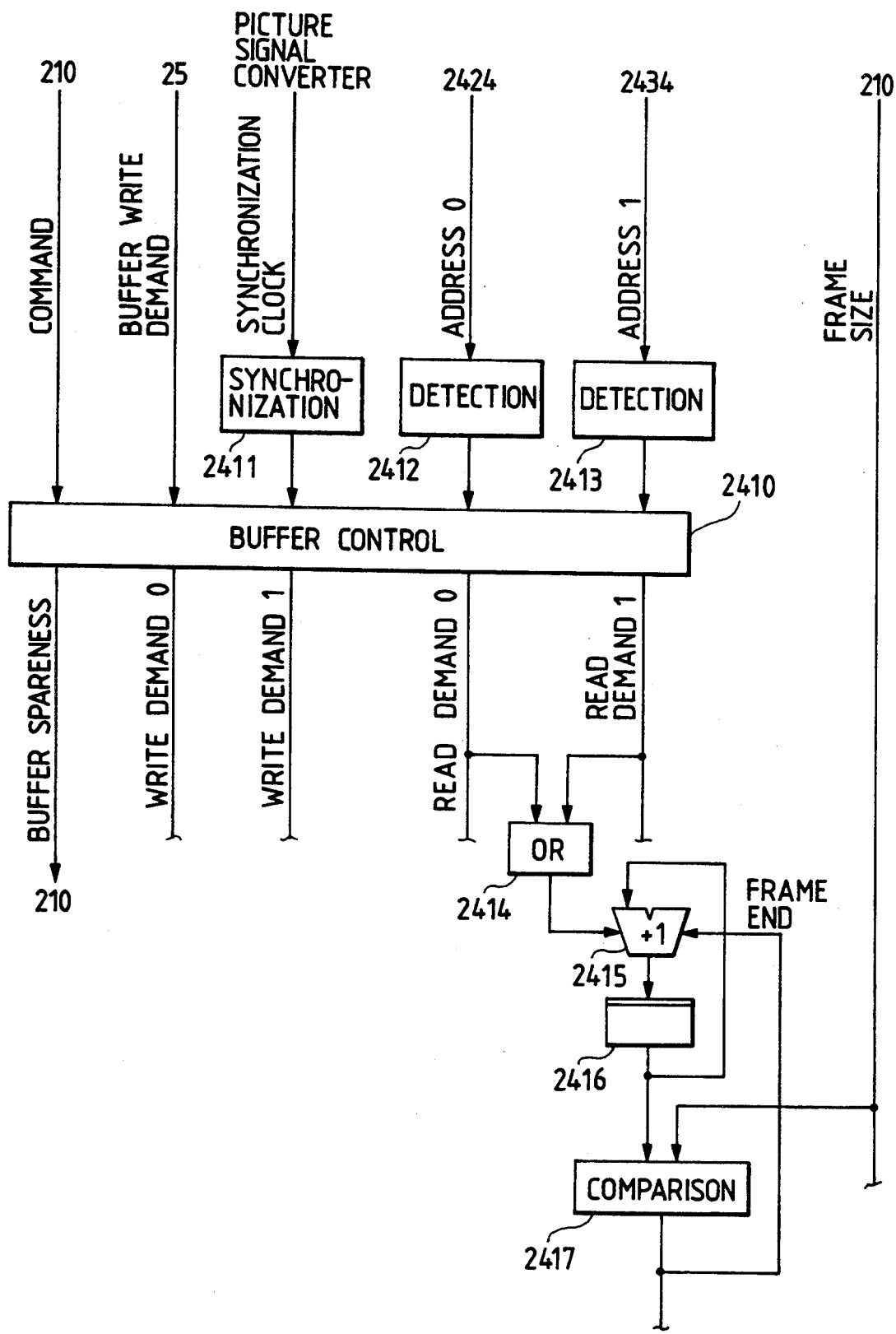
FIGS. 12(A) and 12(B) are block diagrams showing the external transfer data buffers 241/244 of the extended storage data buffer 24 of FIG. 10.
Figure 12B:
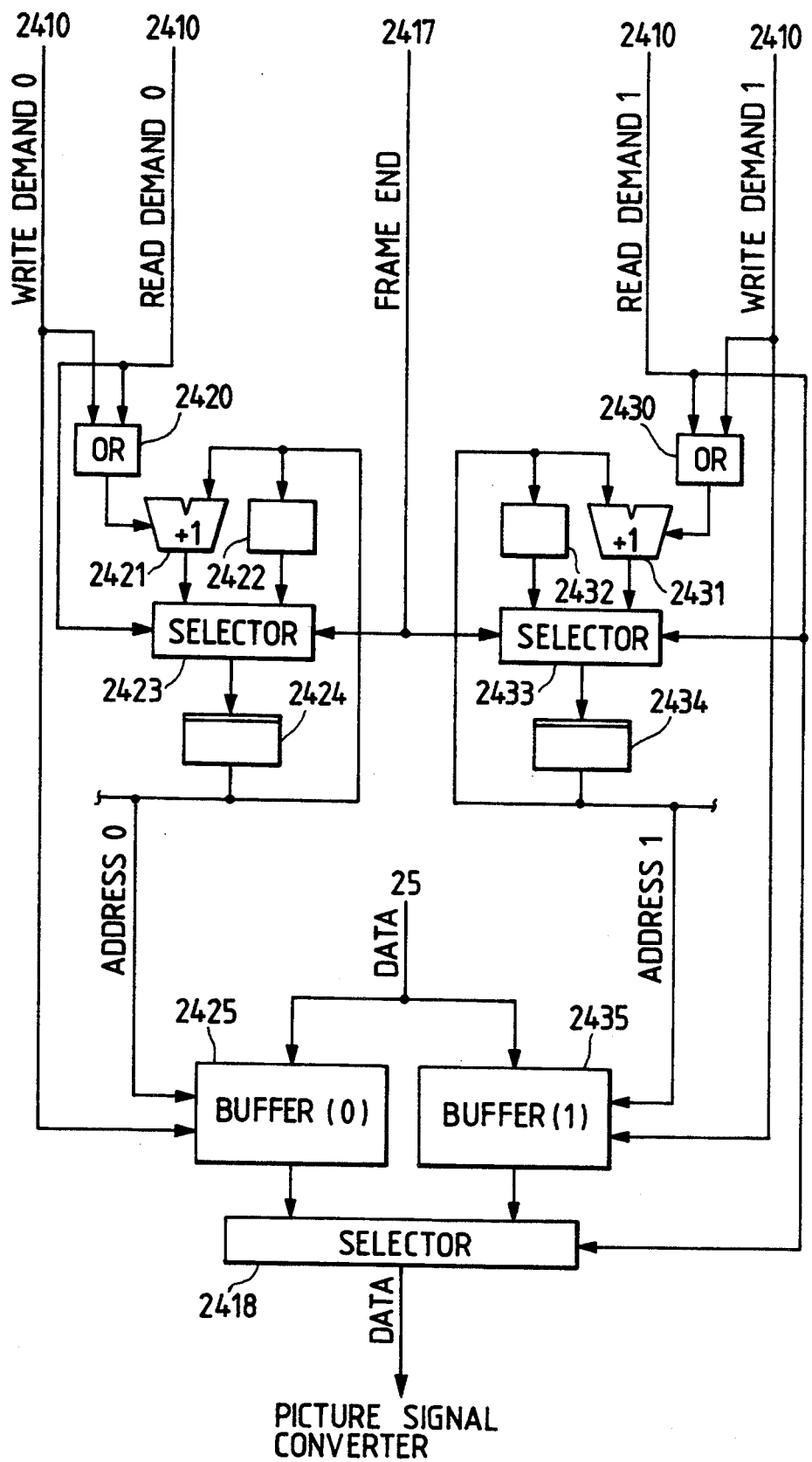

Next, the external transfer data buffer 241 will be described in the following with reference to FIG. 12. The external transfer data buffer 241 is composed of two planes of buffer (O) 2425 and buffer (1) 2435. The reason for providing these two planes is to realize the parallel operations between the internal transfer and the external transfer, as will be described in detail in the following. In the present invention, moreover, the buffer (O) 2425 and the buffer (1) 2435 have a capacity of 4 Kbytes. The writing and reading operations of the buffers (O) 2425 and (1) 2435 are alternately accomplished. Specifically, the two planes of the buffers (O) 2425 and (1) 2435 are written at first, and the reading is accomplished in the order of the buffer (O) 2425 and the buffer (1) 2435. When one plane of the buffer is wholly read out, the plane to be read is changed, and the read plane is written. Here, the external transfer operation is on real time. Unless the writing of the buffer (1) 2435 is ended before all the data of the buffer (O) 2425 are read out, or unless the writing of the buffer (0) 2425 is ended before all the data of the buffer (1) 2435 are read out, the reading of the picture data is interrupted to make the motion picture output impossible. In order to make the motion picture output possible, i.e., not to interrupt the read data, the writing throughput of the buffer is made sufficiently larger than the reading throughput.

If the OUTXT command is issued, as has been described hereinbefore, the command, address and so on are set from the transfer command control unit 21 in the ES requester 23, and the data transfer from the ESD 25 to the external transfer data buffer 241 of the data buffer 24 is started. Moreover, a command instructing the start and end of the external transfer is issued from the transfer control unit 210 to the buffer control 2410 in the external transfer data buffer 241.

The transfer control unit 210 makes such a control that the data of the capacity of the buffer (O) 2425 and the buffer (1) 2435 may be sent out from the ESD 25 to the buffers. When the data transfer from the ESD 25 to the external transfer data buffer 241 is started, the buffer write demand is sent out to the buffer control 2410 so that the data of totally 8 Kbytes are sent out to the buffers (O) 2425 and (1) 2435. The first 4 Kbytes are written in the buffer (O) 2425. The write demand O is inputted from the buffer control 2410 to a logical OR circuit 2420 and the buffer (O) 2425. The write demand O thus inputted to the logical OR circuit 2420 issues an addition request to an adder 2421.

The adder 2421 adds the address 0, which is latched in an address register 2424 of the buffer (O) 2425, at the buffer writing unit, e.g., 4 bytes. The address O is inputted to the adder 2421. The address register 2424 is counted up as the address to be written in the buffer (O) 2425 from O to 4 Kbytes in increments of 4 bytes till the data of the first 4 Kbytes are sent out from the ESD 25, namely, till the write demand O is inputted to the buffer (0). The address thus counted up is selected by a selector 2423 and is inputted again to the address register 2424 in the buffer. Here, the select signals of the selector 2423 are the frame end signal sent out from a comparator 2417 and the read demand 0. In the writing, however, the signals are always at the logical value 0, and the control is made to select the output result, of the adder 2421. The write demand O inputted to the buffer (0) 2425 is the write demand for the buffer (O) 2425.

As has been described hereinbefore, the address O is counted up from O to 4 Kbytes in 4 byte units of the data sent out from the ESD 25 to write the data of 4 Kbytes in the buffer till the write demand O is inputted.

When the writing of the buffer (0) 2425 is ended, the subsequent 4 Kbytes of data are likewise written in the buffer (1) 2435. During the writing of 4 Kbytes in the buffer (1) 2435, the buffer control 2410 sends out the write demand 1 to a logical OR circuit 2430 and the buffer (1) 2435, and an adder 2431 counts up the address 1, which is latched in an in-buffer address register 2434 of the buffer (1) 2435, so that the resultant address 1 is selected by a selector 2433.

When the writing of the buffer (1) 2435 is ended like the control of the buffer (O) 2425, the transfer control unit 210 interrupts the processing of the external transfer data buffer 241 till the buffer empty or partially empty signal is inputted from the buffer control 2410.

When the writing of the buffer (0) 2425 is ended, the reading from the buffer (0), i.e., the data outputting operation of the picture signal converter 3, is started. A clock indicating the data output demand rate is inputted from the picture signal converter 3. Since the external transfer and converter 3 are operating absolutely asynchronously, the clock is synchronized with the clock of the present digital computer of the ES by a synchronization circuit 2411 and is inputted to the buffer control 2410. Moreover, the addresses O and 1, i.e., the outputs of the in-buffer address registers 2424 and 2434 are inputted to circuits 2412 and 2413 for detecting the ends of the writing and reading operations. When the writing of the buffer (O) 2425 is ended, the detection circuit 2412 sends its detection signal to the buffer control 2410 indicating the end of the writing of the buffer. The buffer control 2410 sends out the read demand O or the read request of the buffer (O) 2425 to the logical OR circuits 2414 and 2420 and the selector 2423 in synchronism with the output coming from the synchronization circuit 241 for synchronizing the synchronization clock sent out from the picture signal converter 3 with the clock of the present digital computer.

The read demand O inputted to the logical OR circuit 2420 issues the addition request to the adder 2421 like the writing operation to update the in-buffer address register 2424 of the buffer (0) 2425 thereby to accomplish the count-up control of the address O or the read address of the buffer. The selector 2423 selects the output of the adder 2421 in the reading operation and accepts the frame end. The buffer (O) 2425 is controlled by the address to read out the data in the buffer (O) 2425 in incremental units of the data to be sent out to the picture signal converter 3, thereby to input them to a selector 2418. This selector 2418 has its select signal controlled to output the output data of the buffer (0) while the read demand I of the buffer (1) 2435 is being sent out from the buffer 2410. As a result, while the read demand (O) of the buffer (O) 2425 is being sent out, the data from the buffer (O) 2425 are selected and sent out to the picture signal converter 3.

As has been described hereinbefore, the picture data are sent out from the buffer (O) 2425 to the picture signal converter 3. When all the data, i.e., the data of 4 Kbytes are read out from the buffer (O) 2425, the detection circuit 2412 detects the reading end of the buffer (O) 2425. It is designed that before the detection signal is inputted to the buffer control 2410, the writing of the buffer (1) 2435 is ended, as has been described hereinbefore. Specifically, the write end detection signal 1 inputted from the detection circuit 2413 to the buffer control 2410 occurs first, and thereafter the data reading from the buffer (1) 2435 is started. Like the data reading from the buffer (O) 2425, the data reading from the buffer (1) 2435 is accomplished by inputting the read demand 1 to the logical OR circuits 2414 and 2430, by counting up the address 1 under the control of the read demand 1, by reading out the data from the buffer (1) 2435, by selecting the data in the selector 2418 and by sending out the data to the picture signal converter 3.

When the data reading from the buffer (0) 2425 is ended and detected by the detection circuit 2412, reading is switched from the buffer (O) 2425 to the buffer (1) 2435, as has been described hereinbefore. Simultaneously with this, the buffer (0) empty signal is sent out to the transfer control unit 210. The transfer control unit 210 reopens, when it receives the buffer empty signal, the interrupted data transfer from the ESD 25 to the external transfer data buffer 241. What is different from the first internal data transfer of 8 Kbytes to two planes is that the second transfer amount is the 4 Kbytes of one plane of a buffer, and the remaining operations are absolutely similar to the aforementioned ones. When the writing of the buffer (0) 2425 is ended, the transfer control unit 210 interrupts the writing of data to buffer 241 till the buffer empty signal is inputted again from the buffer (1) 2435 at the end of the reading operation for buffer (1). Then, the external transfer data buffer 241 likewise reads out the buffer (0) 2425 and the buffer (1) 2435 alternately so that the transfer control unit 210 executes the data transfer of 4 Kbytes at each reading of one plane and to write the buffer planes one by one alternately. The writing is intermittent in high speed bursts at a faster rate than the reading that is continuous at a steady uninterrupted rate.

Next, the skipping of data when the frame size is not a multiple of the 4 Kbytes will be described in the following. Since each frame is stored starting at the boundary of 4 Kbytes, as has been described hereinbefore, the data from the last byte of each frame to the next boundary of 4 Kbytes are not picture data, if the frame size is not a multiple of 4 Kbytes, so that the skipping operation has to be accomplished.

When the external transfer operation is started for the output of the picture; data transfer from the external transfer data buffer 241 to the picture signal converter 3 is started, the read demand O or 1 is inputted from the buffer control 2410 to the logical OR 2414, as has been described hereinbefore, the logical OR circuit 2414 issues the addition request to an adder 2415.

This adder 2415 controls the count-up of a read count register 2416. Specifically, the adder 2415 counts up the read count register 2416 when the data are sent out from the external transfer data buffer 241 to the picture signal converter 3, so that the counted-up result, i.e., the transfer data amount is inputted to a comparator 2417.

This comparator 2417 compares the input and the frame size inputted from the transfer control unit 210. In the case of coincidence, the comparator 2417 inputs the frame end signal indicating that the data transfer of one frame is ended, to the adder 2415 and the selectors 2423 and 2433.

When the frame end signal is inputted, the adder 2415 clears the read count register 2416 to restart the count-up operation from 0. When the frame end signal is inputted, the selectors 2423 and control the in-buffer address registers 2424 and 2434 to select the inputs coming from circuits 2422 and 2432 for controlling the skipping amounts. Here, what makes the control is the selector corresponding to the buffer executing the reading at that time. The skipping amount controlling circuits 2422 and 2432 raise the inputted address O to the next boundary of 4 Kbytes. Specifically, when the reading of one frame is ended midway of the boundary of 4 Kbytes, the skipping control of the picture data can be realized by skipping the address to the next boundary of the 4 Kbytes. Since, in the present embodiment, the buffer capacity is 4 Kbytes, the in-buffer address registers 2424 and 2434 are cleared to O so that the skipping of the picture data is realized when the reading end is detected by the direction circuits 2412 and 2413 to switch the buffer reading planes.

The data transfer between the ESD 25 and the data buffer 24 thus far described is accomplished at the unit of 4 Kbytes, as has been described hereinbefore. Each time the requirement for 4 Kbytes is issued, the transfer control unit 210 controls the adder 2134 to count up (by +1) the ES address in the ES address register 2132 and the subtracter 2133 to count down (by −4 Kbytes) the frame transfer amount in the frame transfer amount register 2131. If the result of counting up the ES address indicates the approach of the boundary of a 1 Mbytes ES memory area, namely, if the IDAW boundary is detected by the detection circuit 2136, the detection signal is sent out to the transfer control unit 210 through the selector 2155. This transfer control unit sends out the IDAW in the IDAW register 2124 to the requester 221 through the selector 2156 to accomplish the IDAW fetch, as has been described hereinbefore, thereby to update the ES address in the ES address register 2132.

If the data transfer of one frame is ended, namely, if the frame end is detected by the detection circuit 2135, the detection signal is sent out through the selector 2154 to the transfer control unit 210, in which the frame ending is accomplished. At first, whether or not the repetition number in the repetition number register 2140 is at 0, i.e., the repeat O detection signal of the detection circuit 2142 is examined through the selector 2159. If the number is not 0, the repetition number in the repetition number register 2140 is counted down (by −1) in the subtracter 2141. The IDAWA at the leading end of the frame and the IDAW in the IDAW relief register 2143, i.e., the ES address in the ES address relief register 2144 are set in the IDAWA register 2124 and the ES address register 2132. Then, the frame size is reset in the transfer amount register 2111 so that the picture output is repeated from the leading end of the frame.

If the repeat O detection signal is at 0, the end detection signal of the detection circuit 2129, i.e., whether or not all the frames are outputted, is examined through the selector 2152. If the end detection signal is at 0, the frame number register in the frame number register 2125 is counted down (by −1) by the subtracter 2128 to set the IDAWA of the IDAWA register 2124 and the ES address of the ES address register 2132 in the IDAWA relief register 2143 and the ES address relief register 2144, respectively, and the repetition number and the frame size in the repetition number register 2140 and the frame transfer amount register 2131, respectively, thus starting the picture output of the next frame.

If the end detection signal is at "1", it is indicated that all the frame outputs are ended, thus ending the execution of the present OUTXT command.

If, at this time, the C flag is at "1", the execution of the next command is started. If the C flag is at "0", it is indicated that the whole STRTXT instruction has been ended. Thus, the STRTXT instruction is ended by causing the end interruption for the IP 10.

RDES

Here will be described the operations of the internal transfer to explain the parallel operations of the external transfer and the internal transfer. The description will be of the RDES instruction for the data transfer from the ES 2 to the MS 13.

The internal transfer command according to the RDES instruction is sent from the IP 10 to the ES 2 in accordance with the instruction code of the instruction and the content of the general-purpose register designated by the instruction. The command contains: the operation mode indicating the transfer direction for the transfer ES 2 to 1 from MS 13 or the start signal; the ES address indicating the leading address to the transfer; the MS address indicating the leading address of the transfer; and the transfer amount indicating the transfer data amount. The commands sent from the IP 10 are set in the corresponding registers 2110 to 2113 of the internal transfer command register 211.

The commands set in the internal transfer command register 211 are inputted to the transfer control unit 210. The description to be made in the following assumes that only the internal transfer command by the RDES instruction is set in the internal transfer command register of the internal transfer command register 211 and the external transfer command registers 212 and 218 and that the command of the register 211 is selected by the transfer control unit 210.

If the command of the internal transfer command register 211 is selected, the transfer control unit 210 recognizes that the command is the internal transfer command, and the internal transfer operations of the extended storage are executed and controlled, as follows.

At first, the transfer control unit 210 tests the transfer end through the selector 2154 in the selector 215. If at "1", the residual transfer amount is decided at "0", and the IP 10 is informed of the end of the transfer. If the transfer end is at "0", the command is decoded to start the requesters 22 and 23 and the buffer 24 and to send out the information designating the transfer direction. By the start, moreover, the MS requester 22 is given the MB address whereas the ES requester 23 is given the ES address through the selectors 2156 and 2157 of the selector 215.

After having started the requesters 22 and 23 and the data buffer 24, the transfer control unit 210 instructs the internal transfer command register 211 to update the MS address, the ES address and the transfer amount. In response to the instruction, the internal transfer command register 211 decrements the content of the transfer amount register 2111 by −1 with the subtracter 2114, and the adders 2115 and 2116 increment the contents of the MS address register 2112 and the ES address register 2113 by +1.

The individual requesters 22 and 23 are started by the transfer control unit 210 to execute the data transfer of 4 Kbytes. By this start, the MS requester 22 sets the register 221 with the MS address sent from the selector 2156 of the selector 215 and decodes the command of the transfer control unit 210 with the MS request control unit 224. Likewise, the ES requester 23 sets the registers 230 and 231 with the ES address and decodes the command with the ES request control unit 234.

The data buffer 24 recognizes the data transfer direction from the information sent from the transfer control unit. The buffer amount control unit 2401 controls the ES requester 23 so that the overflow buffer 2403 may be suppressed for the ESD 25 or the data transfer source.

When started by the transfer control unit 210, on the other hand, the ES requester 23 immediately sends the ES address and the command to the ESD 25 to issue the read request. If the read data are sent from the ESD 25 in response to that read request, the data buffer 24 writes the read data in the buffer 2403 while accepting the response sent in synchronism with the read data as the buffer write command. Moreover, the value of the buffer amount register 2400 is incremented by +1.

On the other hand, the MS requester 22 issues the buffer read demand to the data buffer 24 and sends the MS address and the command to the SC 11 to issue the write request. At this time, the data buffer 23 responds to the aforementioned buffer read demand from the requester 22 to read the transfer data from the buffer 2403 and sends the read data as the write data to the SC 11. Moreover, the adder/subtracter 2402 decrements the value of the buffer amount register 2400 by −1.

When the request end is sent from the SC 11 and ESD 25, the individual requesters 22 and 23 inform the transfer control unit 210 of the end of the data transfer which has been started by the transfer control unit 210. When the end is received from both the requesters 22 and 23, the transfer control unit 210 tests the transfer end through the selector 215. For the value "1", the transfer control unit 210 informs the IP 10 of the end of the transfer while deciding that the residual transfer amount is at "0". If the transfer end is at "0", on the other hand, the requesters 22 and 23 and the data buffer 24 are started by the similar procedures to execute the data transfer.

Next, the parallel operations of the internal transfer and one or more external transfers will be described in the following.

At first the parallel operations of the internal transfer and the external transfer will be described. When the STRTXT instruction or the external transfer instruction is issued from the IP 10, the command of the instruction, the address and the transfer amount are set in the external transfer instruction register 212 or 218 of FIG. 4, as has been described hereinbefore, so that the external transfer operations are started by the transfer control unit 210. In the present description, it is assumed that the CN be 0, namely, that the external transfer instruction register 212 is used.

The operations in the transfer control unit 210 will be described in detail with reference to FIG. 15. The transfer control unit 210 is composed of a request control unit 2100, a data transfer control unit 2101, an internal BUSY flip-flop 2102, an internal WAIT flip-flop 2103, external BUSY flip-flops 2104 and 2106, and external WAIT flip-flops 2105 and 2107. There are two respective sets of external BUSY flip-flops and external WAIT flip-flops. These sets correspond to the external transfer command registers 211 and 212, respectively. Since, the external transfer command register 212 is used in the present description, the external BUSY flip-flop 2104 and the external WAIT flip-flop 2105 are valid.

When the STRTXT instruction is issued from the IP 10, the external transfer request is sent out to the transfer control unit 210. Moreover, the request is inputted to the request control unit 2100 in the transfer control unit. The request control unit 2100 administers the requests for the parallel operations of the internal transfer and the plural external transfers in accordance with the control signals of the internal transfer request in response to the internal transfer instruction such as the RDES instruction issued from the IP 10, the plural external transfer request, the state of the internal BUSY flip-flop 2102, the state of the internal WAIT flip-flop 2103, the states of the external BUSY flip-flops 2104 and 2106, the states of the external WAIT flip-flops 2105, 2107 and the request state control signal from the data transfer control unit 2108. The internal BUSY flip-flop 2102 indicates that the internal transfer is being executed; the internal WAIT flip-flop 2103 indicates the wait of execution of the internal transfer; the external BUSY flip-flops 2104 and 2106 indicate that the respectively corresponding external transfers are being executed; and the external WAIT flip-flops 2105 and 2107 indicate that the corresponding external transfers await their executions.

When the external transfer request is inputted to the request control unit 2100, both the internal transfer and the plural external transfers are neither being executed nor awaiting the executions. In other words, all the internal BUSY flip-flop 2102, the internal WAIT flip-flop 2103, the external BUSY flip-flops 2104, 2106 and the external WAIT flip-flops 2105, 2107 have the logical value 0. Therefore, the external BUSY flip-flop 2104 is set at the logical value 1. The outputs of the flip-flops are inputted to the data transfer control unit 2101 for controlling the data transfer so that the data transfer control unit 2101 is triggered by the input of the flip-flops to start the external transfer operations. The subsequent external transfer operations has been described in detail hereinbefore.

If the internal transfer instruction such as the RDES instruction is issued from the IP 10 while the external transfer operations are being executed, the command, address and transfer amount of the instruction are set in the internal transfer instruction register 211 of FIG. 4 so that the internal transfer request is sent out to the transfer control unit 210. The internal transfer request inputted to the transfer control unit 210 is inputted to the request control unit 2100 of FIG. 15. At this instant, the external transfer instruction has already been issued so that the external transfer operations are being executed, namely, that the external BUSY flip-flop 2104 is at the logical value 1. The operations occupy the MS requester 22, the ES requester 23, and the external transfer data buffer 241 in the data buffer 24 so that the external transfer is executed. Thus, the internal transfer operations cannot be executed so that the request control unit 2100 sets the internal WAIT flip-flop 2103 at the logical value 1. As a result, the request states at this time are such that the two states of the internal WAIT flip-flop 2103 and the external BUSY flip-flop 2104 are in the state of the logical value 1, and such that the remaining internal BUSY flip-flop 2102, external BUSY flip-flop 2106 and external WAIT flip-flops 2105, 2107 are in the state of the logical value 0.

If the throughput to be written in the external transfer data buffer 241 is designed to take a higher value than the throughput to be read out, as has been described hereinbefore, in the external transfer operations, the MS requester 22 and the ES requester 23 can be opened to the internal transfer instruction when the writing of the buffer is ended and when the buffer empty signal is inputted from the buffer to the transfer control unit 210.

When the writing of the external transfer data buffer 241 of the external transfer operations is ended, the data transfer control unit 2101 examines the flip-flops 2102 to 2107. In the present embodiment, the logical value of the internal WAIT flip-flop 2103 is at 1, namely, the internal transfer operations are awaiting their execution. These internal transfer operations are executed till the buffer empty signal is inputted from the external transfer data buffer 241. At first, in response to the request state control signal, the internal WAIT flip-flop 2103 is reset to 0, and the internal BUSY flip-flop 2102 is set to the logical value 1. As a result, the request states are such that the two states of the internal BUSY flip-flop 2102 and the external BUSY flip-flop 2104 are at the logical value 1, and such that the states of the other internal WAIT flip-flop 2103 and external WAIT flip-flops 2105, 2107 are at the logical value 0.

The output of the internal BUSY flip-flop 2102 is inputted to the data transfer control unit 2101 so that the data transfer control 2101 is triggered by the input of the flip-flop to start the internal transfer operations. The subsequent internal transfer operations have already been described.

If the aforementioned internal transfer operations are ended before the buffer empty signal is inputted from the external transfer data buffer 241 to the data transfer control unit 210, the data transfer control unit 2101 resets the internal BUSY flip-flop 2102 to the logical value 0. As a result, only the external BUSY flip-flop 2104 is set again to the state of the logical value 1.

If the buffer empty signal is inputted from the external transfer data buffer 241 to the data transfer control unit 210 before the internal transfer operations are ended, these internal transfer operations are interrupted to open the MS requester 22 and the ES requester 23 to the external transfer operations. This is because the external transfer operations are processed on real-time and the picture signals are not exhausted. If the data in the external transfer buffer 241 disappear during the external transfer operations, it would make it impossible to display and record the motion pictures on real time. If the internal transfer operations are interrupted to reopen the external transfer operations, there is no harm done and the writing of the external transfer data buffer 241 is executed. When the writing of the buffer is ended, the data transfer control unit 2101 examines the states of the flip-flops 2102 to 2107, as has been described hereinbefore.

Since the internal BUSY flip-flop 2102 is at the logical level 1, namely, since the internal transfer operations are being interrupted, these internal transfer operations are executed until the buffer empty signal is inputted again from the external transfer data buffer 241. Likewise, the parallel operations of the internal transfer instruction and the external transfer instruction can be accomplished by executing the internal transfer operations while the external transfer operations are awaiting the buffer empty signal from the external transfer data buffer 241. Incidentally, when the external transfer operations are wholly ended, the external BUSY flip-flop 2104 is reset to the logical value 0 in response to the request state control signal.

The parallel operations between the two external transfers will be described in the following. When an external transfer instruction having the CN at 0 is issued from the IP 10 so that its command, address and transfer amount are set in the external transfer common register 212, the external BUSY flip-flop 2104 of the transfer control unit 210 is set to start the external transfer operations, as has been described hereinbefore. If a second external transfer instruction having the CN at 1 is issued from the IP 10 during the execution of the external transfer instruction, its command, address and transfer amount are set in the external transfer command register 214. If the transfer control unit 210 receives the second external transfer request, the request control unit 2100 examines the states of the flip-flops 2102 to 2107. Since, at this time, the external BUSY flip-flop 2104 is set, the first external transfer operations are being executed, and the second external transfer request is caused to await its execution, that is to say, the external WAIT flip-flop 2107 is set.

As has been described in connection with the parallel operations of the internal transfer and the external transfer: when the writing of the external transfer data buffer 241 by the first external transfer is ended, the data transfer control unit 2101 sets the external BUSY flip-flop 2106 and resets the external WAIT flip-flop 2105 to start the second external transfer operations, i.e., the writing of the external transfer data buffer 244. Here; what is different from the parallel operations of the internal transfer and the external transfer is neither to interrupt the second external transfer operations nor to reopen the first external transfer operations even if the buffer empty signal is reported from the first external transfer data buffer 241 to the data transfer control unit 2101 during the writing of the external transfer data buffer 244 by the second external transfer operations. This is because the second external transfer operations are naturally processed on real time so that the real-time display and recording of the motion pictures by the second external transfer instruction cannot be accomplished if the second external transfer operations are interrupted.

After the end of the writing of the second external transfer data buffer 244, therefore, the MS requester 22 and the ES requester 23 are opened to reopen the first external transfer operations. The internal transfer operations are unstable the whole time depending upon the transfer amount, but the external transfer operations have a constant writing time of the external transfer data buffers 241 and 244. If, therefore, the write throughput of the external transfer data buffers 241 and 244 is made sufficiently larger than the read throughput, the parallel operations of the real-time display and recording of the motion pictures by the two external transfer instructions can be accomplished by the aforementioned controls. Although the parallel operations between the internal transfer instruction and the external transfer and between the two external transfers have been described, the parallel operations among the three operations of the internal transfer instruction and the two external transfer instructions can be accomplished in similar manners.

Although the motion picture outputting thus far described is directed to the case in which the ES is used as the internal storage for storing the frame picture data, another example using the MS will be described with reference to FIG. 13.

The storage of the same picture data (of RGB type) of plural frames in the MS 13 reduces the number of storable frames to an extent in which the MS capacity is smaller than the ES capacity, but the remainder is similar to the storage case of the ES. The read path of the picture data of the MS 13 is limited in the prior art to the path from the IOP 12 through the SC 11. If a path of high throughput (e.g., 34 Mbytes/sec or more) capable of outputting the motion pictures from the MS 13 is provided directly for the picture signal converter 3, then it is possible to perform the operations similar to the aforementioned ones, in which the motion picture data are stored in the ES so that the data may be transferred from the ES2 directly to the picture signal converter 3.

One embodiment of the information processing system capable of displaying and recording the motion pictures on real time according to the present invention will be described in the following with reference to FIG. 1.

The data of the numerical computations by the digital computer are converted by the graphic processing program into the graphic data having the RGB digital values (the three primaries of red, blue and green in saturations) of picture elements, and the data of the whole frame are once stored in the ES 2. By starting the external transfer by the IP 10, as has been described hereinbefore, the frame data are outputted from the ES 2 sequentially to the picture signal converter 3 at such a constant time interval that they can be viewed as motion pictures on real time. The picture signal converter 3 has a function to D/A convert the digital RGB data inputted once into the analog RGB signals and further into the TV picture signals according to the NTSC system, for example. These NTSC signals outputted from the picture signal converter 3 are fed to the display device 17 or the recording device 4 so that the motion pictures can be display and recorded on real time. The display device 17 is a device capable of displaying the NTSC signals inputted on a frame, as exemplified by a monitor TV receiver. On the other hand, the recording device 4 is a device capable of recording the NTSC signals inputted, as exemplified by a video tape recorder or an optical disc recorder. According to the procedures of displaying and recording the motion pictures on real time by the present system, picture data are once stored in the ES 2, and the recording device 4 is then brought into its recording state, followed by the execution of starting the external transfer. During this external transfer, the motion pictures are displayed and recorded. After the end of the external transfer, the recording device 4 is stopped, and the display device 17 is used as the play monitor of the recording device 4. Then, the recorded motion pictures can be played at any times desired.

The description thus far has assumed that the picture conversion system conforms to the NTSC standards. There a re practiced at present other TV standards such as the PAL system or the SECAN system. The HDTV (Hi-Vision) system is also being tried. Any of these systems is equipped with a real time output device desiring continuous data, such as the display device, the recording device and a printer. In order to match the desired data rate of those systems other than the NTSC system for real time operation, the digital picture data to be stored in the ES have to be stored in the manner suited for the individual system. This can be accomplished by changing the graphic processing program of the digital computer. Another inevitable problem is that the hardware of the picture signal converter of the D/A conversion are different for the systems.

Moreover, the transfer speed of the external transfer from the ES 2 to the picture signal converter 3 becomes different. Generally speaking, the finer frame information requires the higher transfer speed. However, the ES itself has high transfer ability for the internal transfer and the external transfer, and the transfer speed of the external transfer is far lower than that of the internal transfer. Therefore, the execution of the internal transfer and the plural external transfers is possible and meaningful, as has been described hereinbefore. In short, it can be the that the external transfer speed of the ES basically has room for changes.

In order to find wide applications to the various picture signal conversion systems, therefore, it is possible to change the external transfer speeds in various manners with ease, and it is then sufficient to change the program and the picture signal converter. It is especially desirable that the external transfer speed is automatically changed by connecting the picture signal converter 3 with the various picture conversion systems.

One embodiment of the system to be widely applied to various picture conversion systems of the present invention will be described in the following with reference to FIGS. 1 and 12.

The picture signal converter 3 outputs the clock signal at a fundamental signal conversion rate "clock" to the ES 2. The ES 2 inputs the clock signal to the synchronization circuit 2411 so that it may be synchronized with the ES internal clock (Which is sufficiently faster than the clock of the picture signal converter). The clock thus synchronized is used as the external transfer buffer read demand rate and is inputted to the buffer control 2410. As a result, the data, which are reflected on the read demand 0/1 and outputted finally from the buffer 2425/2435, match the fundamental signal conversion rate of the picture signal converter 3.

Here will be described the operations of the SIGXT, SETLC and TIXT commands of the ESCW for explaining one embodiment of the composite picture taking system. As has been described hereinbefore in connection with the external transfer operations: the extended storage external transfer command is sent from the IP 10 to the ES 2 in response to the STRTXT instruction so that the command register 2120 and the ESAW register 2121 of the external transfer command register 212 are set with the commands and the ESAW, respectively. When the commands are selected by the transfer control unit 210, the ESAW set in the ESAW register 2121 is sent through the selector 215 to the requester 22 to command the ESCW read. In response to this request, the ESC. W read out from the MS 13 is set in the subcommand register 2122 and the transfer information register 2123 of the external transfer command register 212. When the ESCW is set in the aforementioned registers 2122 and 2123, the transfer control unit 210 decodes the subcommand.

In case this subcommand is the SIGXT command, the transfer control unit 210 sends out the set signal of the flip-flop 2161 to the composite picture control unit 216 (or the composite picture control unit 217 in case the external transfer command register 218 is used). As a result, the flip-flop 2161 takes the value "1" so that the control signal is sent out to the recording device 4.

In case the subcommand is the SETLC command, the count value is included in the ESCW and is set in the transfer information register 2123. The count value is set in the loop count register 2137 of the external transfer command register 212 (or 218).

In case the subcommand is the TIXT command, the transfer control unit 210 tests the value of the B flag set in the transfer information register 2123. For the P flag at "0", the value of the condition register 2162 is tested at first. If the condition register takes the value "1", the subsequent ESCW read is accomplished in accordance with the ESAW of the ESAW register 2121 (which is set with the value incremented by +1 after the foregoing ESCW read). If the condition register takes the value "0", the value of the loop count register 2137 is tested. If the value of the register is positive, it is decremented by "−1", and the main storage address set in the transfer information register 2123 is set in the ESAW register 2121 to accomplish the ESCW read. If the value of the register is at "0", on the other hand, the end interruption is issued from the transfer control unit 210 to the IP 10 to end the present STRTXT instruction.

If the value of the B flag is at "1", the value of the loop count register 2137 is tested, not the condition register. If the value of the register is at "0", the ESCW read is accomplished in accordance with the ESAW of the ESAW register 2121. If the register value is at "1", it is decremented by "−1", and the main storage address set in the transfer information register 2123 is set in the ESAW register 2121 to accomplish the ESCW read.

The command chain will be briefly described in the following.

The OUTXT, SIGXT and SETLC commands of the ESCW have a C flag of (4 bits).

The C flag is set in the transfer information register 2123 at the instant of the ESCW read.

When any of the OUTXT, SIGXT and SETLC commands is ended, the transfer control unit 210 tests the value of the C flag in the transfer information register 2123.

In case the value of the C flag is at "1", the subsequent ESCW read is accomplished in accordance with the ESAW set in the ESAW register 2121.

In case the C flag value is "0", the transfer control unit 210 generates the end interruption to the IP 10 to end the present STRTXT instruction.

Thus, by setting the C flag at "1", the ESCW row written in 'he continuous area of the MS can be executed by the single start of tile STRTXT instruction.

Figure 14:
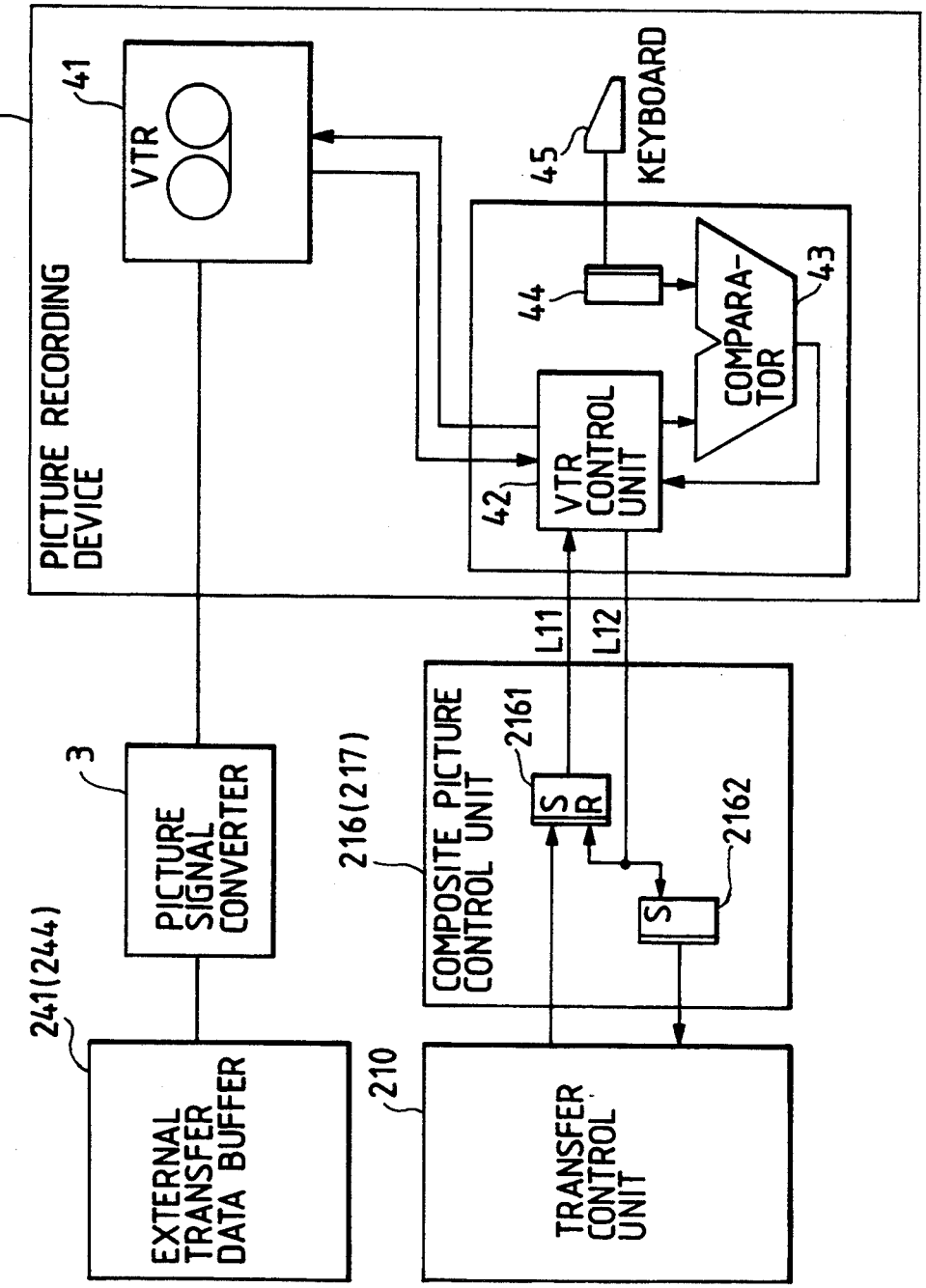
FIG. 14 is a block diagram showing the structure of the information processing system having functions to record composite pictures according to still another embodiment of the present invention.

One embodiment of the composite picture system of the present invention will be described in the following with reference to FIGS. 1 and 14.

The composite picture operations are accomplished by taking advantage of the present system for the aforementioned framing, such that a plurality of frame data (assuming one cut is composed of N frames) to be recorded on real time are sequentially recorded over the recording medium with their plural cuts (or L cuts) being continued. Thus, the composite picture operations are used for forming motion pictures of N×L frames by using the amount of extended storage for the N frames. It is possible to form the motion pictures over the capacity to be used by the extended storage by joining plural motion pictures.

In order to start the recording from the position expected for the recording medium, generally speaking, the positioning operations are required but are different for the recording devices and mediums, as will be described in connection with the VTR. In this VTR, the tape is positioned before the recording start position and made to run so that the speed of the drive system may be finely adjusted. After this fine adjustment, the recording state is entered from the recording point while leaving the tape running.

In the composite picture operations, therefore, there arises a problem of discontinuity of the recording tape between the first frame recorded at this time and the latest frame recorded before, if there is a failure in the accurate synchronism between the instant when the first picture data are outputted from the ES 2 and the instant when the recording state of the VTR is entered. In the framing of the prior art, a certain frame is repeatedly outputted from the frame memory 14 so that the frames are fixed for a long time. Thus, the VTR 16 may be controlled so that one frame out of the many repeatedly sent frames may be recorded at a certain instant during the fixed period. Therefore, the composite picture operations are required for the framing to have the moment accuracy of the control interface.

In the present embodiment, as shown in FIG., 14, the recording device 4 is constructed to include a VTR 41 and its control devices 42 to 45. For the recording operation, the register group 44 is set in advance with the frame number N of one cut and the cut number L by the keyboard 45. It is assumed that the video tape is written with the recording position information called the time codes TC. Next, the control of the synchronization between the VTR and the ES will be described in the following.

VTR Operations (V0) First of all, the tape is positioned to and stopped at the composite picture recording start position by the manual operation of the VTR. The VTR control unit 42 interprets the present stop position as the recording point and stores the TC of the stop position to make a preroll, that is rewind, for preparing the recording operations.

(V1) The VTR control unit 42 senses whether or not the flip-flop 2161 of the composite picture control unit 216 of the ES 2 is set, and awaits the setting.

(V2) When the flip-flop 2161 is set, the VTR control unit 42 is shifted to the tape running and fine speed adjustment to read out the TC momently from the running tape.

(V3) If it is detected that the read TC has advanced ahead of the TC at the stored recording point by one frame, the VTR control unit 42 issues a signal through the line L12 for setting the flip-flop 2162 of the composite picture control unit 216 of the ES 2, and the operation comes into the recording state. Simultaneously with this, the flip-flop 2161 of the control unit 216 is reset.

(V4) In this recording state, the VTR control unit 42 records the preset frame number N in that recording state. When this recording is ended, the control unit 42 instructs the VTR 41 to stop. The VTR control unit 42 makes a preroll after it records as its next recording point the value which is the summation of the position stored at present and the recording frame number N.

The composite picture operations are ended by repeating the foregoing steps (V1) to (V4) by the preset cut number L.

Next, the processing of the ES 2 for the aforementioned operations will be described in the following. These composite picture operations are accomplished by the following ESCW row:

ES Operations:
(E1) SIGXT (1);
(E2) OUTXT (1, 1, iO, 1, FS);
(E3) TIXT (1, E2); and
(E4) OUTXT (1, 1, il, N, FS).

The ES 2 is started from the IP 10 in accordance with the STRTXT instruction.

(E1) In accordance with the SIGXT command, the transfer control unit 210 sets the flip-flop 2161 of the composite picture control unit 216 (or 217). (If this is detected, the VTR control unit 42 is shifted from the foregoing Step (V1) to Step (V2).)

(E2) One frame (which will be called the dummy frame) is outputted in response to the OUTXT command.

(V3) The value of the flip-flop 2162 of the composite picture control unit 216 is sensed by the TIXT command. If set, the procedures advance to the operation (E4). If not, the procedure is returned to the operation (E2) to repeat the outputting of the dummy frame.

(E4) The data of N frames are continuously outputted.

Thus, the external transfer operations of the STRTXT instruction are ended, and the external transfer is restarted in response to the STRTXT instruction if the preparation and storage of the data of the subsequent N frames are ended. These operations are repeated by the cut number L.

The relation in the synchronization between the VTR control and the ES control will be diagrammatically shown in the following:

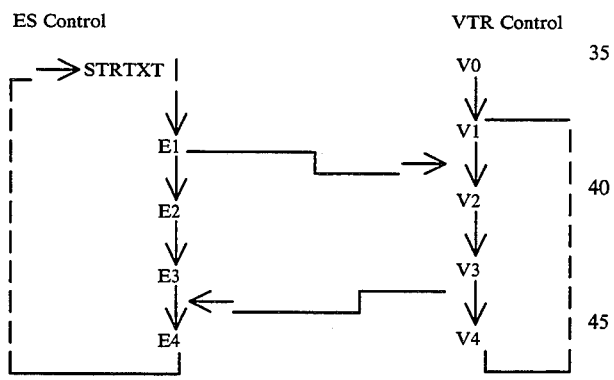

At the input of the frame number N and the cut number L, moreover, the register group 44 is set in advance with the recording start: TC of the video tape by means of the keyboard 45. Then, the composite picture operations can be accomplished, as will be described in the following, without positioning the tape to the recording start position by the manual operation of the VTR before the composite picture operation. In the aforementioned operation (V0), the VTR control unit 42 compares (V0') the recording start position set in the register group 44 and the TC on the tape to search the recording start position of the running tape. At the end of the search, the control unit 42 stops the VTR 41. Then, the preroll is accomplished. After this, the operations are shifted to the foregoing Step (V1), and the operations to be subsequently accomplished are similar to the foregoing ones.

Thus, the composite picture operations can be accomplished from the designated recording start position of the recording medium.

Next, one embodiment of the system capable of displaying and recording still pictures and in slow motions according to the present invention will be described in the following with reference to FIG. 1.

The still picture displaying and recording system can be constructed by modifying the information processing system of FIG. 1 such that only the one frame data stored in the ES 2 is repeatedly transferred to the outside. The ESCW row at this time is as follows:
(S0) SETLC (1, count);
(S1) OUTXT (1, 1, iO, 1, FS); and
(S3) TIXT (0, S1).

Now, the frame data of the count number are outputted and seen as a still picture.

Likewise, the following ESCW row is used for the slow motion pictures of 1/n speed:
S0) SETLC (1, n);
(SI) OUTXT (1, 1, iO, 1, FS);
(S3) TIXT (0, S1);
(S4) SETLC (1, n);
(S5) OUTXT (1, 1, i 1, 1, FS);
(S6) TIXT (0, S4);

The outputtings of the frame data starting from iO, il and so on, respectively, are accomplished by n times so that the slow motion to be realized can have an indication speed of 1/n.

By setting the frame repetition number of the OUTXT command, moreover, the display/recording of the still pictures and the slow motions can be realized in the following manners by each using one ESCW:
Still Picture
OUTXT (0, RPT,, iO, 1, FS).
Slow Motion
OUTXT (0, RPT, iO, n, FS).

As is now apparent from the description thus far made, the present invention has the following effects:

According to the present invention, the picture data prepared by the digital computer are stored, and the high-speed interface is provided to supply the picture data therethrough at such a constant speed as can be viewed as motion pictures on real time.

According to the present invention, the motion pictures can be displayed and recorded on real time by the system composed of the aforementioned digital computer, ES, picture signal converter, display device and recording device.

According to the present invention, the system composed of the aforementioned digital computer, ES, picture signal converter, display device and recording device has functions to start the recording from the designated recording position of the recording medium of the recording device and to synchronize the outputting start time of the picture signals and the recording start time of the recording device so that the composite pictures can be accurately recorded on the recording medium even if the recording, of the continuous plural pictures is accomplished intermittently and repeatedly.

According to the present invention, the system composed of the aforementioned digital computer, ES, picture signal converter, display device and recording device has an extended storage branch command to display and record still pictures and to display motion pictures in slow motions.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A method for producing a motion picture on a real time basis comprising, the steps of:
    providing a computer system having a main memory and a higher speed extended memory;
    interconnecting an instruction processor, input/output processor and storage control device operatively with the main memory within the computer system, and interconnecting the instruction processor and storage control device operatively to directly control the extended memory independently of the input/output processor;
    generating frames of digital data from digital data stored in main memory, with each frame being of a length sufficient to completely provide display information of one complete picture of display;
    storing all of the generated frames of digital data in the extended memory in sufficient number to provide the motion picture;
    retrieving the frames of digital data from the extended memory in order of the motion picture;
    buffering the retrieved frames of digital data retrieved from the extended memory by writing the retrieved frames of digital data according to a reading speed of the extended memory to a buffer storage and reading the buffer storage at a speed slower that writing of the buffer at a continuous data rate for all of the frames, and thus continuously outputting a data stream of uniform data rate serially containing all of the frames of digital data to an output device; and
    simultaneously with the outputting, displaying the information of the frames of digital data serially to produce the motion picture on a real time basis on a video display as the output device.

2. A method according to claim 1, including, within the display, receiving the frames of digital data from the buffer storage and converting the frames of digital data into frames of video data, by decoding the digital data to obtain intensity gradations.

3. A method according to claim 1, including transmitting a clock between the output device and the computer system for matching the readout speed of the buffer storage with the input speed of the display;
    including bypassing the input/output processor of the computer system in performing said steps of buffering and outputting, and performing said outputting through a separate high speed interface of the extended storage;
    including conducting said steps of reading and writing the buffer storage simultaneously and in parallel;
    including performing computer operations with the instruction processor, storage control, input/output processor and main memory as a method of operating the computer performing simultaneously and in parallel with said method of producing a motion picture; and
    including providing the frame size greater than one megabyte and performing said step of reading data out of the buffer at the rate of at least about 30 frames per second.

4. The method according to claim 3, wherein said steps of reading and writing said buffer include reading one buffer for a read cycle sufficient to read the contents of the one buffer while simultaneously writing another buffer for a small fraction of the read cycle, alternating with reading the another buffer for a full immediately contiguous equal time read cycle and writing the one buffer for the small fraction of the read cycle.

5. The method according to claim 3, including dividing the extended storage memory into blocks of memory that contain 2 raised to a power of an integer bytes of data;
    storing the frames of digital data in the extended storage memory with a frame size in bytes that is not equal to an integer times 2 raised to some integer power; and
    counting the bytes of data written to the buffer from the extended storage memory for each frame and providing a skip control when the count equals the frame size, skipping the data in an unread portion of the current block of memory in the extended storage memory in response to the skip control to immediately read out the first byte of the next frame at the start of a new block, so that the flow of data direct to the buffer is not interrupted from one frame to the next.

6. The method according to claim 3, including, in the output device, converting each byte of the frame data into video data by decoding each byte into one of 256 gradations of display intensity.

7. The method according to claim 3, further including, in the extended storage, performing successive ones of said reading steps continuously for plural frames of digital data independently of control from the computer system storage control and independently of the computer system instruction processor by using a separate instruction processor and storage control of the extended storage.

8. The method according to claim 3, further including in the extended storage unit, performing successive ones of said reading steps continuously for plural frames of data independently of control from the computer system storage control and independently of the computer system instruction processor by using a separate instruction processor and storage control of the extended storage, for a plurality of frames of data in physically discontinuous and logically successive memory locations.

9. The method according to claim 3, including performing the method with a super computer as the computer system.

10. The method according to claim 3, including storing an extended storage start command in the main memory to include the starting address of main memory information including the first command word, address within the extended storage of the first byte of digital data of the first frame of the motion picture, and an external transfer device number;
    fetching the extended storage start command from the main memory under control of the storage control device; decoding the extended storage start command in the instruction processor and executing the start command to obtain the extended storage address and external transfer device number;
    sending the device number, extended storage address and extended storage start signal to the extended storage to thereby terminate the start command execution within the computer system instruction processor; and
    within the extended storage, controlling the direct memory reading of the main storage to obtain extended storage command words starting at the extended storage address provided by the start instruction, and decoding and executing all the extended storage command words in the extended storage as a program sufficient for the reading of all the frames independently of the instruction processor of the computer system.

11. The method according to claim 10, including formatting each extended storage command word with an operation code, storage address, frame number, frame size, frame repetition number and command chain flag.

12. The method according to claim 11, including reading the buffer storage continuously and repeatedly for the same frame for a number of times equal to the frame repetition number within the extended storage command word being executed, whereby the repeat number may be set at a low integer for a continuous motion picture, at a larger integer for a slow motion picture, or at a still larger integer for still pictures, each of varying degrees corresponding to a range of integers.

13. The method according to claim 12, including, within the extended storage, interpreting the command chain flag and reading the next extended storage command word from the next main storage address that is the address within the current command word, under one condition of the command chain flag.

14. The method according to claim 11, including, within the extended storage, interpreting the command chain flag and reading the next extended storage command word from the next main storage address that is the address within the current command word, under one condition of the command chain flag.

15. The method according to claim 3, wherein said extended memory has a memory that is a logical division of a single physical memory also containing said main memory.

16. The method according to claim 3, wherein said extended memory has a memory of greater storage capacity than and physically separate from said main memory.

17. The method according to claim 3, including dividing the extended storage memory into memory areas of at least one megabyte with boundaries between the memory areas; and indirect data addressing the frames by storing an integer plurality of frames of the digital data in the extended storage memory between the boundaries; and within the extended storage, determining the physically adjacent extended storage memory addresses for successive fetches of frames of digital data and determining when the next fetch will go beyond an adjacent boundary and in response obtaining the address of the boundary of the start of the addresses of the next area to fetch the next indirect data address word to thereby determine the next memory area between boundaries.

18. The method according to claim 17, including dividing each extended memory area between boundaries into blocks; and providing extended storage address words including the extended storage address of the next block within an area and an address chain flag, with the address chain flag having one condition indicating that the address is an extended storage address of the start of the next block and another condition indicating that the address is a main memory address containing the address of start of the next boundary.

19. The method according to claim 3, including storing command words in internal transfer and external transfer command registers, within the extended storage for respectively providing programs of commands for internal transfer and commands for external transfer; wherein internal transfer is within the computer system and external transfer includes said step of outputting.

20. The method according to claim 19, storing the extended transfer command words in at least two different external transfer command registers having different external transfer command programs.

21. The method according to claim 20, including conduction parallel interpretation and execution of extended storage command words in at least two of the command registers within the extended storage, determining conflict of operations and establishing a priority of operations between the execution of commands of different registers for interrupting the operation from the lower priority register command word during such conflict, with execution of an external transfer command having priority over execution of an internal transfer command.

22. The method according to claim 21, including interpreting and executing the command words of the command registers within the extended storage independently of the digital computer system instruction processor so that the instruction processor can execute an instruction other than that of an extended storage command word in parallel with the execution of extended storage command words in the extended storage.

23. The method according to claim 20, including interpreting and executing the command words of the command registers within the extended storage independently of the digital computer system instruction processor so that the instruction processor can execute an instruction other than that of an extended storage command word in parallel with the execution of extended storage command words in the extended storage.

24. The method according to claim 19, including interpreting and executing the command words of the command registers within the extended storage independently of the digital computer system instruction processor so that the instruction processor can execute an instruction other than that of an extended storage command word in parallel with the execution of extended storage command words in the extended storage.

25. The method according to claim 19, including conduction parallel interpretation and execution of extended storage command words in at least two of the command registers within the extended storage, determining conflict of operations and establishing a priority of operations between the execution of commands of different registers for interrupting the operation from the lower priority register command word during such conflict, with execution of an external transfer command having priority over execution of an internal transfer command.

26. The method according to claim 25, including interpreting and executing the command words of the command registers within the extended storage independently of the digital computer system instruction .processor so that the instruction processor can execute an instruction other than that of an extended storage command word in parallel with the execution of extended storage command words in the extended storage.

27. The method according to claim 3, wherein said reading and writing are conducted with respect to continuous logical addresses for all of the frames of digital data of the motion picture, which logical addresses correspond to discontinuous physical addresses.

28. The method according to claim 1, including transmitting a clock between the output device and the computer system for matching the readout speed of the buffer storage with the input speed of the display.

29. The method according to claim 1, including bypassing the input/output processor of the computer system in performing said steps of buffering and outputting, and performing said outputting through a separate high speed interface of the extended storage.

30. The method according to claim 1, including conducting said steps of reading and writing the buffer storage simultaneously and in parallel; and
   including performing computer operations with the instruction processor, storage, control, input/output processor and main memory as a method of operating the computer performed simultaneously and in parallel with said method of producing a motion picture.

31. The method according to claim 1, wherein said steps of reading and writing said buffer include reading one buffer for a read cycle sufficient to read the contents of the one buffer while simultaneously writing another buffer for a small fraction of the read cycle, alternating with reading the another buffer for a full immediately contiguous equal time read cycle and writing the one buffer for the small fraction of the read cycle.

32. The method according to claim 1, including dividing the extended storage memory into small blocks of memory that contain 2 raised to a power of an integer bytes of data; storing the frames of digital data in the extended storage memory with a frame size in bytes that is not equal to an integer times 2 raised to some integer power; and
   counting the bytes of data written to the buffer from the extended storage memory for each frame and providing a skip control when the count equals the frame size, skipping the data in the unread portion of the current block of memory in the extended storage memory in response to the skip control to immediately read out the first byte of the next frame at the start of a new block, so that the flow of data direct to the buffer is not interrupted from one frame to the next.

33. The method according to claim i, including providing the frame size greater than one megabyte and performing said step of reading data out of the buffer at the rate of at least about 30 frames per second.

34. The method according to claim 1, including, in the output device, converting each byte of the frame data into video data by decoding each byte into one of 256 gradations of display intensity.

35. The method according to claim 1, further including, in the extended storage, performing successive ones of said reading steps continuously for plural frames of digital data independently of control from the computer system storage control and independently of the computer system instruction processor by using a separate instruction processor and storage control of the extended storage.

36. The method according to claim 1, further including in the extended storage unit, performing successive ones of said reading steps continuously for plural frames of data independently of control from the computer system storage control and independently of the computer system instruction processor by using a separate instruction processor and storage control of the extended storage, for a plurality of frames of data in physically discontinuous and logically successive memory locations.

37. The method according to claim 1, including performing the method with a super computer as the computer system.

38. The method according to claim 1, including storing an extended storage start command in the main memory to include the starting address of main memory information including the first command word, and address within the extended storage of the first byte of digital data of the first frame of the motion picture and an external transfer device number;
   fetching the extended storage start command from the main memory under control of the storage control device; decoding the extended storage start command in the instruction processor and executing the command word to obtain the extended storage address and external transfer device number;
   sending the device number, extended storage address and extended storage start signal to the extended storage to thereby terminate the start command execution within the computer system instruction processor; and
   within the extended storage, controlling the direct memory reading of the main storage to obtain extended storage command words starting at the extended storage address provided by the start instruction, and decoding and executing all the extended storage command words in the extended storage as a program sufficient for the reading of all the frames independently of the instruction processor of the computer system.

39. The method according to claim 38, including formatting each extended storage command word with an operation code, storage address, frame number, frame size, frame repetition number and command chain flag.

40. The method according to claim 39, including reading the buffer storage continuously and repeatedly for the same frame for a number of times equal to the frame repetition number within the extended storage command word being executed, whereby the repeat number may be set at a low integer for a continuous motion picture, at a larger integer for a slow motion picture, or at a still larger integer for still pictures, each of varying degrees corresponding to a range of integers.

41. The method according to claim 40, including, within the extended storage, interpreting the command chain flag and reading the next extended storage command word from the next main storage address that is the address within the current command word, under one condition of the command chain flag.

42. The method according to claim 39, including, within the extended storage, interpreting the command chain flag and reading the next extended storage command word from the next main storage address that is the address within the current command word, under one condition of the command chain flag.

43. The method according to claim 1, wherein said extended memory has a memory that is a logical division of a single physical memory also containing said main memory.

44. The method according to claim 1, wherein said extended memory has a memory of greater storage capacity than and physically separate from said main memory.

45. The method according to claim 1, including dividing the extended storage memory into memory areas of at least one megabyte with boundaries between t he addresses; indirect data addressing the frames by storing an integer plurality of frames of the digital data in the extended storage memory between the boundaries; and within the extended storage, determining physically adjacent extended storage memory addresses for successive fetches of frames of digital data and determining when a next fetch will go beyond an adjacent boundary and in response obtaining the address of the boundary of the start of the addresses of the next area to fetch the next indirect data address word to thereby determine the next memory area between boundaries.

46. The method according to claim 45, including dividing each extended memory area between boundaries into blocks;

providing extended storage address words including the extended storage address of the next block within an area and an address chain flag, with the address chain flag having one condition indicating that the address is an extended storage address of the start of the next block and another condition indicating that the address is a main memory address containing the address of start of the next boundary.

47. The method according to claim 1, including storing command words in internal transfer and external transfer command registers, within the extended storage for respectively providing programs of commands for internal transfer and commands for external transfer; wherein internal transfer is within the computer system and external transfer includes said step of outputting.

48. The method according to claim 47, storing the extended transfer command words in at least two different external transfer command registers having different external transfer command programs.

49. The method according to claim 48, including conducting parallel interpretation and execution of extended storage command words in at least two of the command registers within the extended storage, determining conflict of operations and establishing a priority of operations between the execution of commands of different registers for interrupting the operation from the lower priority register command word during such conflict, with execution of an external transfer command having priority over execution of an internal transfer command.

50. The method according to claim 49, including interpreting and executing the command words of the command registers within the extended storage independently of the digital computer system instruction processor so that the instruction processor can execute an instruction other than that of an extended storage command word in parallel with the execution of extended storage command words in the extended storage.

51. The method according to claim 48, including interpreting and executing the command words of the command registers within the extended storage independently of the digital computer system instruction processor so that the instruction processor can execute an instruction other than that of an extended storage command word in parallel with the execution of extended storage command words in the extended storage.

52. The method according to claim 47, including interpreting and executing the command words of the command registers within the extended storage independently of the digital computer system instruction processor so that the instruction processor can execute an instruction other than that of an extended storage command word in parallel with the execution of extended storage command words in the extended storage.

53. The method according to claim 1, wherein said reading and writing are conducted with respect to continuous logical addresses for all of the frames of digital data of the motion picture, which correspond to discontinuous physical addresses.

54. A method for producing a motion picture on a real time basis comprising, the steps of:

providing a computer system having a main memory and a higher speed extended memory;

interconnecting an instruction processor, input/output processor, and storage control device operatively with the main memory within the computer system., and interconnecting the instruction processor and storage control device operatively to directly control the extended memory independently of the input/output processor;

generating frames of digital data from digital data stored in main memory, with each frame being of a length sufficient to completely provide display information of one complete picture of display;

storing all of the generated frames of digital data in the extended memory in sufficient number to provide the motion picture;

retrieving the frames of digital data from the extended memory in order of the motion picture;

buffering the retrieved frames of digital data retrieved from the extended memory by writing the retrieved frames of digital data according to a reading speed of the extended memory to a buffer storage and reading the buffer storage at a speed slower that writing of the buffer at a continuous data rate for all of the frames, and thus continuously outputting a data stream of uniform data rate serially containing all of the frames of digital data to an output device; and continuously recording the video display information corresponding to the frames of digital data read out from the buffer storage simultaneously with said reading of the buffer storage on a real time basis on a recorder as the output device.

55. The method according to claim 54, including controlling the recorder as a video recorder to receive the digital data as video information, by the steps of:

starting the video recorder by transmitting a starting signal between the video recorder and the extended storage;

sending dummy digital data from the extended storage to the video recorder to synchronize the speed of the video recorder with a reading data rate of the buffer storage;

thereafter, sending a condition signal from the video recorder to the extended storage; and in response to the condition signal, starting reading of the first frame of digital data; and thereafter running the video recorder at said synchronized rate to receive and record all of the video frames of digital data continuously, without interruption in time and space between frames on a real time basis, wherein the recording speed of the video recorder is matched to the reading speed of the buffer storage.

56. The method according to claim 54, including transmitting a clock between the output device and the computer system for matching the readout speed of the buffer storage with the input speed of the display;

including bypassing the input/output processor of the computer system in performing said steps of buffering and outputting, and performing said outputting through a separate high speed interface of the extended storage;

including conducting said steps of reading and writing the buffer storage simultaneously and in parallel;

including performing computer operations with the instruction processor, storage control, input/output processor and main memory as a method of operating the computer performed simultaneously and in parallel with said method of producing a motion picture; and including providing the frame size greater than one megabyte and performing said step of reading data out of the buffer at the rate of at least about 30 frames per second.

57. The method according to claim 56, including dividing the extended storage memory into small blocks of memory that contain 2 raised to a power of an integer bytes of data;

storing the frames of digital data in the extended storage memory with a frame size in bytes that is not equal to an integer times 2 raised to some integer power; and counting the bytes of data written to the buffer from the extended storage memory for each frame and providing a skip control when the count equals the frame size, skipping the data in an unread portion of the current block of memory in the extended storage memory in response to the skip control to immediately read out the first byte of the next frame at the start of a new block, so that the flow of data direct to the buffer is not interrupted from one frame to the next.

58. The method according to claim 56, wherein said steps of reading and writing said buffer include reading one buffer for a read cycle sufficient to read the contents of the one buffer while simultaneously writing another buffer for a small fraction of the read cycle, alternating with reading the another buffer for a full immediately contiguous equal time read cycle and writing the one buffer for the small fraction of the read cycle.

59. The method according to claim 56, including, in the output device, converting each byte of the frame data into video data by decoding each byte into one of 256 gradations of display intensity.

60. The method according to claim 56, further including, in the extended storage, performing successive ones of said reading steps continuously for plural frames of digital data independently of control from the computer system storage control and independently of the computer system instruction processor by using a separate instruction processor and storage control of the extended storage.

61. The method according to claim 56, further including in the extended storage unit, performing successive ones of said reading steps continuously for plural frames of data independently of control from the computer system storage control and independently of the computer system instruction processor by using a separate instruction processor and storage control of the extended storage, for a plurality of frames of data in physically discontinuous and logically successive memory locations.

62. The method according to claim 56, including performing the method with a super computer as the computer system.

63. The method according to claim 56, including storing an extended storage start command in the main memory to include the starting address of main memory information including the first command word, address within the extended storage of the first byte of digital data of the first frame of the motion picture, and an external transfer device number;

fetching the extended storage start command from the main memory under control of the storage control device; decoding the extended storage start command in the instruction processor and executing the command word to obtain the extended storage address and external transfer device number;

sending the device number, extended storage address and extended storage start signal to the extended storage to thereby terminate the start command execution within the computer system instruction processor; and within the extended storage, controlling the direct memory reading of the main storage to obtain extended storage command words starting at the extended storage address provided by the start instruction, and decoding and executing all the extended storage command words in the extended storage as a program sufficient for the reading of all the frames independently of the instruction processor of the computer system.

64. The method according to claim 63, including formatting each extended storage command word with an operation code, storage address, frame number, frame size, frame repetition number and command chain flag.

65. The method according to claim 64, including reading the buffer storage continuously and repeatedly for the same frame for a number of times equal to the frame repetition number within the extended storage command word being executed, whereby the repeat number may be set at a low integer for a continuous motion picture, at a larger integer for a slow motion picture, or at a still larger integer for still pictures, each of varying degrees corresponding to a range of integers.

66. The method according to claim 65, including, within the extended storage, interpreting the command chain flag and reading the next extended storage command word from the next main storage address that is the address within the current command word, under one condition of the command chain flag.

67. The method according to claim 64, including, within the extended storage, interpreting the command chain flag and reading the next extended storage command word from the next main storage address that is the address within the current command word, under one condition of the command chain flag.

68. The method according to claim 56, wherein said extended memory has a memory that is a logical division of a single physical memory also containing said main memory.

69. The method according to claim 56, wherein said extended memory has a memory of greater storage capacity than and physically separate from said main memory.

70. The method according to claim 56 including dividing the extended storage memory into memory areas of at least one megabyte with boundaries between the memory areas;
   indirect data addressing the frames by storing an integer plurality of frames of the digital data in the extended storage memory between the boundaries; and
   within the extended storage, determining the physically adjacent extended storage memory addresses for successive fetches of frames of digital data and determining when the next fetch will go beyond an adjacent boundary and in response obtaining the address of the boundary of the start of the addresses of the next area to fetch the next indirect data address word to thereby determine the next memory area between boundaries.

71. The method according to claim 70, including dividing each extended memory area between boundaries into blocks; and
   providing extended storage address words including the extended storage address of the next block within an area and an address chain flag, with the address chain flag having one condition indicating that the address is an extended storage address of the start of the next block and another condition indicating that the address is a main memory address containing the address of start of the next boundary.

72. The method according to claim 56, including storing command words in internal transfer and external transfer command registers, within the extended storage for respectively providing programs of commands for internal transfer and commands for external transfer; wherein internal transfer is within the computer system and external transfer includes said step of outputting.

73. The method according to claim 2, storing the extended transfer command words in at least two different external transfer command registers having different external transfer command programs.

74. The method according to claim 73, including conducting parallel interpretation and execution of extended storage command words in at least two of the command registers within the extended storage, determining conflict of operations and establishing a priority of operations between the execution of commands of different registers for interrupting the operation from the lower priority register command word during such conflict, with execution of an external transfer command having priority over execution of an internal transfer command.

75. The method according to claim 74, including interpreting and executing the command words of the command registers within the extended storage independently of the digital computer system instruction processor so that the instruction processor can execute an instruction other than that of an extended storage command word in parallel with the execution of extended storage command words in the extended storage.

76. The method according to claim 73, including interpreting and executing the command words of the command registers within the extended storage independently of the digital computer system instruction processor so that the instruction processor can execute an instruction other than that of an extended storage command word in parallel with the execution of extended storage command words in the extended storage.

77. The method according to claim 73, including interpreting and executing the command words of the command registers within the extended storage independently of the digital computer system instruction processor so that the instruction processor can execute an instruction other than that of an extended storage command word in parallel with the execution of extended storage command words in the extended storage.

78. The method according to claim 73, including conducting parallel interpretation and execution of extended storage command words in at least two of the command registers within the extended storage, determining conflict of operations and establishing a priority of operations between the execution of commands of different registers for interrupting the operation from the lower priority register command word during such conflict, with execution of an external transfer command having priority over execution of an internal transfer command.

79. The method according to claim 78, including interpreting and executing the command words of the command registers within the extended storage independently of the digital computer system instruction processor so that the instruction processor can execute an instruction other than that of an extended storage command word in parallel with the execution of extended storage command words in the extended storage.

80. The method according to claim 56, wherein said reading and writing are conducted with respect to continuous logical addresses for all of the frames of digital data of the motion picture, which addresses correspond to discontinuous physical addresses.

81. An apparatus for producing a motion picture on a real time basis, comprising:
   a computer system having a main memory and, a higher speed extended memory;
   an instruction processor, input/output processor and storage control device operatively interconnected with the main memory within the computer system, and with the instruction processor and storage control device operatively connected to directly control the extended memory independently of the input/output processor;
   means for generating frames of digital data from digital data stored in said main memory, with each frame being of a length to completely provide display information of one complete picture of the display;
   means storing all of the generated frames of digital data in the extended memory in sufficient number to provide the motion picture;
   means retrieving the frames of digital data from the extended memory in order of the motion picture;

means buffering retrieved frames of digital data from the extended memory by writing the retrieved frames of digital data in high speed bursts according to a high reading speed of the extended memory to a buffer storage.; and means reading the buffer storage at a speed slower than writing of the buffer at a continuous data rate for all of the frames, and thus continuously outputting a data stream of uniform data rate serially containing all of the frames of digital data to an output device; and means for transmitting a clock between the output device and the computer system for matching the readout speed of the buffer storage with the input speed of the display;

a separate high speed interface of the extended storage;

said means bypassing the input/output processor of the computer system and performing said outputting through said interface;

said means conducting said reading and writing of the buffer storage simultaneously and in parallel;

means performing computer operations with the instruction processor, storage control, input/output processor and main memory simultaneously and in parallel with the functions of all of said means; and means providing a frame size greater than one megabyte and said means buffering reading data out of the buffer at the rate of at least about 30 frames per second.

82. The apparatus according to claim 81, including:

means dividing the extended storage memory into blocks of memory that contain 2 raised to a power of an integer bytes of data;

means storing the frames of digital data in the extended storage memory with a frame size in bytes that is not equal to an integer times 2 raised to some integer power;

means counting the bytes of data written to the buffer from the extended storage memory for each frame and providing a skip control when the count equals the frame size; and means skipping the data in an unread portion of the current block of memory in the extended storage memory in response to the skip control to immediately read out the first byte of the next frame at the start of a new block, so that the flow of data direct to the buffer is not interrupted from one frame to the next.

83. The apparatus according to claim 81, wherein the computer system is a super computer.

* * * * *